United States Patent
Liu et al.

(10) Patent No.: US 12,094,130 B2
(45) Date of Patent: Sep. 17, 2024

(54) SYSTEMS AND METHODS FOR DETECTING AND TRACKING HUMANS IN CAPTURED IMAGES

(71) Applicant: Walmart Apollo, LLC, Bentonville, AR (US)

(72) Inventors: Haining Liu, Dallas, TX (US); Ryan B. Reagan, Fort Worth, TX (US); Zhichun Xiao, Plano, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 526 days.

(21) Appl. No.: 17/389,154

(22) Filed: Jul. 29, 2021

(65) Prior Publication Data
US 2022/0036568 A1    Feb. 3, 2022

Related U.S. Application Data

(60) Provisional application No. 63/058,981, filed on Jul. 30, 2020, provisional application No. 63/058,998, filed on Jul. 30, 2020.

(51) Int. Cl.
*G06T 7/246* (2017.01)
*G06F 16/583* (2019.01)
(Continued)

(52) U.S. Cl.
CPC .......... *G06T 7/248* (2017.01); *G06F 16/5838* (2019.01); *G06Q 10/06311* (2013.01);
(Continued)

(58) Field of Classification Search
CPC ...... G06V 40/00; G06V 40/10; G06V 40/103; G06V 40/107; G06V 10/50; G06V 10/56;
(Continued)

(56) References Cited

U.S. PATENT DOCUMENTS

| 5,465,115 A | 11/1995 | Conrad |
| 7,957,565 B1 | 6/2011 | Sharma |

(Continued)

FOREIGN PATENT DOCUMENTS

| CN | 102663449 A | 9/2012 |
| CN | 110084138 A | 8/2019 |

(Continued)

OTHER PUBLICATIONS

Hua, Quan; "[CVPR 2017] OpenPose: Realtime Multi-Person 2D Pose Estimation using Part Affinity Fields"; Jun. 21, 2019; <https://towardsdatascience.com/cvpr-2017-openpose-realtime-multi-person-2d-pose-estimation-using-part-affinity-fields-f2ce18d720e8>; pp. 1-13.

(Continued)

*Primary Examiner* — Sumati Lefkowitz
*Assistant Examiner* — Chelsea J Greene
(74) *Attorney, Agent, or Firm* — Foley IP Law, PLLC

(57) ABSTRACT

In some embodiments, apparatuses and methods are provided herein useful to detecting and tracking humans. In some embodiments, there is provided a system for detecting and tracking humans from one image to another image including: a camera; a control circuit configure to: receive a first image; detect a plurality of key body joints of a first human captured on the first image; determine segmentations of the plurality of key body joints to determine one or more body parts of the first human; determine a color distribution map of aggregate pixels associated with each body part of the first human on the first image; and cause a database to store the color distribution map; and a database comprising one or more color distribution map sets each associated with a detected human in a captured image of the camera.

20 Claims, 17 Drawing Sheets

(51) Int. Cl.
*G06Q 10/0631* (2023.01)
*G06Q 30/0201* (2023.01)
*G06T 7/90* (2017.01)
*G06V 40/10* (2022.01)
*H04N 7/18* (2006.01)

(52) U.S. Cl.
CPC ............ *G06Q 30/0201* (2013.01); *G06T 7/90* (2017.01); *G06V 40/103* (2022.01); *H04N 7/183* (2013.01); *G06T 2207/30196* (2013.01); *G06T 2207/30232* (2013.01); *G06T 2207/30242* (2013.01)

(58) Field of Classification Search
CPC ...... G06V 10/443; G06V 20/52; G06V 20/53; G06V 20/40; G06V 40/161; G06V 40/172; G06V 40/168; G06V 10/82; G06V 40/16; G06V 10/764; G06V 20/10; G06V 20/46; G06V 40/166; G06V 40/20; G06V 20/80; G06V 20/95; G06V 10/40; G06V 10/761; G06V 30/224; G06V 10/44; G06V 10/774; G06V 10/933; G06V 20/625; G06V 2201/08; G06V 10/751; G06V 20/00; G06V 40/174; G06V 40/28; G06V 10/22; G06V 10/75; G06V 10/771; G06V 10/95; G06V 20/20; G06V 20/41; G06V 20/584; G06V 20/70; G06V 2201/07; G06V 30/153; G06V 40/23; G06V 10/267; G06V 10/462; G06V 10/762; G06V 20/188; G06V 20/62; G06V 40/171; G06V 40/197; G06V 10/54; G06V 20/44; G06V 20/68; G06V 20/698; G06V 30/19173; G06V 40/173; G06V 40/40; G06V 40/50; G06V 10/20; G06V 10/25; G06V 10/255; G06V 10/26; G06V 10/30; G06V 10/467; G06V 10/58; G06V 10/803; G06V 10/806; G06V 10/96; G06V 20/13; G06V 20/42; G06V 20/58; G06V 20/59; G06V 20/597; G06V 20/647; G06V 20/695; G06V 30/10; G06V 40/1347; G06V 40/176; G06V 40/18; G06V 40/193; G06V 10/10; G06V 10/141; G06V 10/17; G06V 10/245; G06V 10/28; G06V 10/32; G06V 10/34; G06V 10/42; G06V 10/454; G06V 10/507; G06V 10/70; G06V 10/7515; G06V 10/758; G06V 10/7715; G06V 20/17; G06V 20/30; G06V 20/47; G06V 20/48; G06V 20/63; G06V 20/64; G06V 20/653; G06V 20/69; G06V 2201/03; G06V 2201/034; G06V 30/1444; G06V 30/147; G06V 30/148; G06V 30/162; G06V 30/1801; G06V 30/19093; G06V 30/19147; G06V 30/2247; G06V 30/2455; G06V 30/40; G06V 30/422; G06V 40/12; G06V 40/1365; G06V 40/165; G06V 40/169; G06V 40/45; G06V 40/70; G06T 2207/30196; G06T 2207/30232; G06T 2207/30242; G06T 7/10; G06T 7/70; G06T 7/73; G06T 7/90; G06T 7/174; G06T 7/00; G06T 7/80; G06T 2007/10024; G06T 2207/20084; G06T 17/00; G06T 2207/20081; G06T 11/001; G06T 2207/10016; G06T 7/0002; G06T 5/70; G06T 7/0004; G06T 7/0012; G06T 17/05; G06T 19/006; G06T 19/20; G06T 7/11; G06T 7/246; G06T 2207/10028; G06T 2207/10056; G06T 2207/20221; G06T 11/206; G06T 13/20; G06T 2200/24; G06T 2207/10048; G06T 2207/20021; G06T 2207/30108; G06T 2207/30188; G06T 2207/30201; G06T 3/04; G06T 7/187; G06T 7/20; G06T 7/60; G06T 11/60; G06T 13/00; G06T 15/005; G06T 2207/10004; G06T 2207/10132; G06T 2207/20032; G06T 2207/30024; G06T 2207/30096; G06T 2207/30164; G06T 2207/30168; G06T 2207/30244; G06T 2219/2012; G06T 5/50; G06T 7/001; G06T 7/13; G06T 7/269; G06T 7/62; G06T 13/80; G06T 15/04; G06T 15/205; G06T 17/10; G06T 17/205; G06T 19/00; G06T 19/003; G06T 2200/04; G06T 2207/10012; G06T 2207/10032; G06T 2207/30004; G06T 2207/30124; G06T 2207/30184; G06T 2207/30204; G06T 2207/30241; G06T 2207/30261; G06T 2210/04; G06T 5/90; G06T 7/0006; G06T 7/0014; G06T 7/12; G06T 7/136; G06T 7/155; G06T 7/215; G06T 7/30; G06T 7/41; G06T 1/00; G06T 1/0021; G06T 1/60; G06T 11/005; G06T 11/203; G06T 13/40; G06T 15/10; G06T 15/80; G06T 2200/32; G06T 2207/10008; G06T 2207/10068; G06T 2207/10088; G06T 2207/10116; G06T 2207/20128; G06T 2207/20152; G06T 2207/30008; G06T 2207/30128; G06T 2207/30144; G06T 2207/30221; G06T 2210/16; G06T 2210/41; G06T 3/00; G06T 3/14; G06T 3/40; G06T 3/4038; G06T 3/4084; G06T 5/00; G06T 5/20; G06T 5/92; G06T 7/168; G06T 7/181; G06T 7/254; G06T 7/55; G06T 7/97; G06T 9/00; G06Q 10/063114; G06Q 30/015; G06Q 10/06; A61B 2503/20; A61B 5/1171; G06F 18/22; G06F 18/24
See application file for complete search history.

(56) References Cited

U.S. PATENT DOCUMENTS

| | | | |
|---|---|---|---|
| 9,129,397 B2 | 9/2015 | Choi | |
| 9,158,975 B2* | 10/2015 | Lipton | ............... G08B 13/1968 |
| 9,697,609 B2 | 7/2017 | Kim | |
| 10,055,853 B1* | 8/2018 | Fisher | ..................... H04N 23/90 |
| 10,255,779 B2* | 4/2019 | Dey | ................. G08B 13/19695 |
| 2009/0089107 A1 | 4/2009 | Angell | |
| 2013/0182114 A1* | 7/2013 | Zhang | .................. A61B 5/0013 |
| | | | 348/150 |
| 2014/0365334 A1 | 12/2014 | Hurewitz | |
| 2016/0381335 A1* | 12/2016 | Tao | ........................... H04N 9/68 |
| | | | 348/575 |
| 2019/0096066 A1* | 3/2019 | Chen | ........................ G06T 7/11 |

FOREIGN PATENT DOCUMENTS

| | | |
|---|---|---|
| CN | 110309779 A | 10/2019 |
| EP | 2791903 B1 | 11/2015 |
| EP | 1862941 B1 | 10/2016 |
| WO | 2009086088 | 7/2009 |
| WO | 2010080949 | 7/2010 |

(56) References Cited

FOREIGN PATENT DOCUMENTS

| WO | WO-2018020275 A1 * | 2/2018 | ......... G06K 9/00248 |
| WO | 2019114696 A1 | 6/2019 | |

OTHER PUBLICATIONS

Karstens, Frank; "What is the RGB color space?"; Basler; Mar. 24, 2020; <https://www.baslerweb.com/en/sales-support/knowledge-base/frequently-asked-questions/what-is-the-rgb-color-space/15179/>; pp. 1-3.

Mwiti, Derrick; "A 2019 Guide to Human Pose Estimation"; Heartbeat; Aug. 5, 2019; <https://heartbeat.fritz.ai/a-2019-guide-to-human-pose-estimation-c10b79b64b73>; pp. 1-50.

Nikolenko, Sergey; "NeuroNuggets: Understanding Human Poses in Real-Time"; Apr. 24, 2018; <https://medium.com/neuromation-blog/neuronuggets-understanding-human-poses-in-real-time-b73cb74b3818>; pp. 1-17.

Oved, Dan, et al.; "[Updated] BodyPix: Real-time Person Segmentation in the Browser with TensorFlow.js"; TensorFlow Blog; Nov. 18, 2019; <https://blog.tensorflow.org/2019/11/updated-bodypix-2.html>; pp. 1-20.

Potetz, Brian, et al.; "Statistical correlations between two-dimensional images and three-dimensional structures in natural scenes"; J. Opt. Soc. Am. A; Jul. 2003; vol. 20, No. 7; <http://www.cnbc.cmu.edu/~tai/papers/brian_josa.pdf>; pp. 1292-1303.

Wikipedia; "Light meter"; <http://web.archive.org/web/20190828222406/https://en.wikipedia.org/wiki/Light_meter>; Aug. 28, 2019; pp. 1-9.

Wikipedia; "RGB color model"; <http://web.archive.org/web/20191122050038/https://en.wikipedia.org/wiki/RGB_color_model>; Nov. 22, 2019; pp. 1-12.

Woodford, Chris; "Digital cameras"; Explain that Stuff !; Sep. 9, 2019; <http://web.archive.org/web/20191126101133/https://www.explainthatstuff.com/digitalcameras.html>; pp. 1-15.

Yaadhav, Raaj, et al.; "Efficient Online Multi-Person 2D Pose Tracking with Recurrent Spatio-Temporal Affinity Fields"; Jun. 12, 2019; pp. 1-12.

Podugu, Kartik; "How do computers represent a pixel color in RGB format, and how does RGB know colours?"; Jan. 30, 2019; <https://www.quora.com/How-do-computers-represent-a-pixelcolor-in-RGB-format-and-how-does-RGB-know-colours>; pp. 1-2.

\* cited by examiner

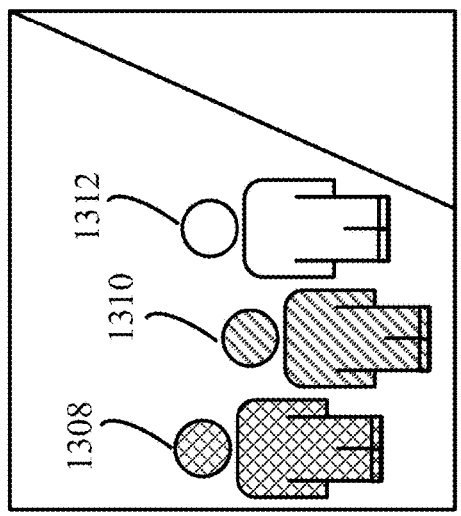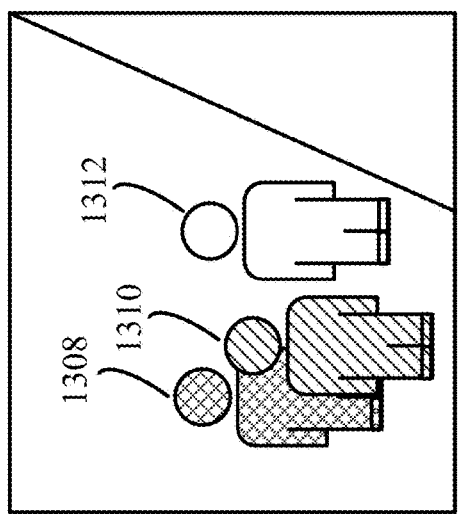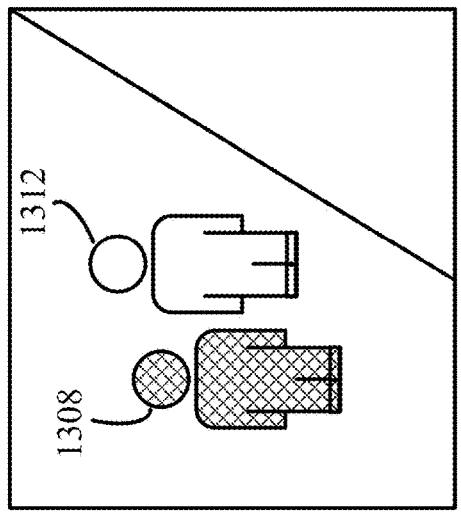
FIG. 13

SYSTEMS AND METHODS FOR DETECTING AND TRACKING HUMANS IN CAPTURED IMAGES

CROSS-REFERENCE TO RELATED APPLICATIONS

This application claims the benefit of U.S. Provisional Application No. 63/058,998 filed Jul. 30, 2020 and U.S. Provisional Application No. 63/058,981 filed Jul. 30, 2020, both of which are incorporated herein by reference in their entirety.

TECHNICAL FIELD

This invention relates generally to detecting and tracking humans in captured images and distinguishing a customer from an associate or employee in the captured images.

BACKGROUND

Generally, a camera in a retail store captures images of a location. The images may show humans, carts, animals, and items for sale. An associate of the retail store may monitor in real time the captured images. However, generally, the captured images are stored for later viewing when needed. Additionally, an associate viewing the captured images may manually distinguish a customer from an associate in the captured images.

BRIEF DESCRIPTION OF THE DRAWINGS

Disclosed herein are embodiments of systems, apparatuses and methods pertaining to detecting and tracking humans and distinguishing a customer from an associate or employee from one image to another image. This description includes drawings, wherein:

FIG. 13 is a simplified illustration of an exemplary detecting and tracking humans and distinguishing a customer from an associate or employee from one image to another image in accordance with some embodiments;

Figure 1:
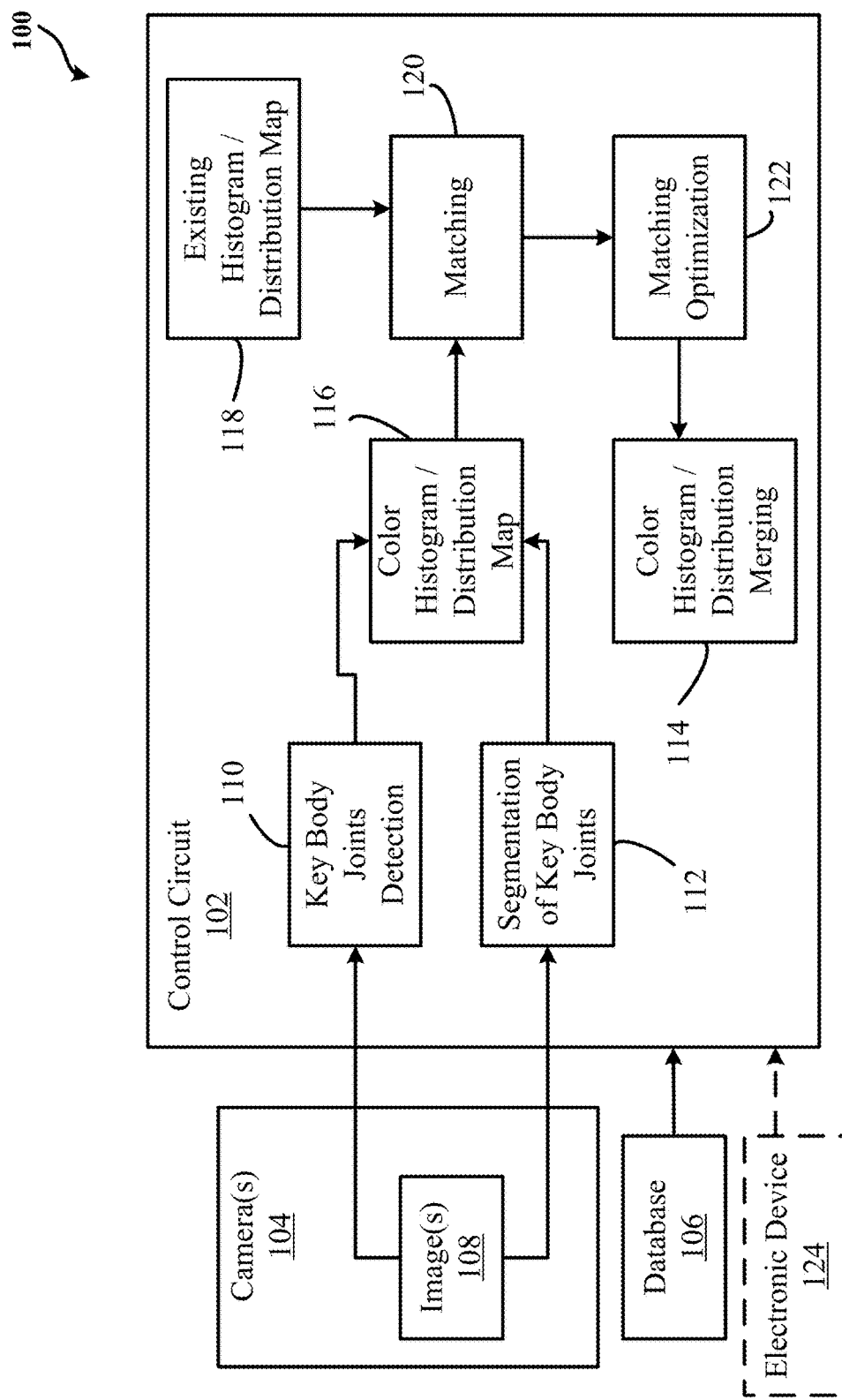
FIG. 1 illustrates a simplified block diagram of an exemplary system for detecting and tracking humans and distinguishing a customer from an associate or employee from one image to another image in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for detecting and tracking humans at a retail store. In some embodiments, a system for detecting and tracking humans from one image to another image captured by a camera at a retail store include a camera configured to capture, at a first time, a first image of an area at a retail store. By one approach, the system may include a control circuit coupled to the camera. In one configuration, the control circuit may receive the first image. In another configuration, the control circuit may detect a plurality of key body joints of a first human captured on the first image. For example, each of the plurality of key body joints may be a point of interest along a skeletal anatomy of the first human. In another configuration, the control circuit may determine segmentations of the plurality of key body joints of the first human to determine one or more body parts of the first human in response to the detection of the plurality of key body joints. In another configuration, the control circuit may determine a color distribution map of aggregate pixels associated with each body part of the one or more body parts of the first human on the first image. In one scenario, each color distribution map may be used by the control circuit to differentiate between the first human and another human in the first image. In yet another configuration, the control circuit may cause a database to store the color distribution map for each body part of the first human on the first image. By one approach, the system may include the database coupled to the control circuit. For example, the database may include one or more color distribution map sets each associated with a detected human in a captured image of the camera.

In some embodiments, a method for detecting and tracking humans from one image to another image captured by a camera at a retail store includes capturing, at a first time by a camera, a first image of an area at a retail store. By one approach, the method may include receiving, by a control circuit coupled to the camera, the first image. Alternatively or in addition to, the method may include detecting, by the control circuit, a plurality of key body joints of a first human captured on the first image. For example, each of the plurality of key body joints may be a point of interest along a skeletal anatomy of the first human. In one configuration, the method may include, in response to the detection of the plurality of key body joints, determining segmentations of the plurality of key body joints of the first human to determine one or more body parts of the first human. Alternatively or in addition to, the method may include determining, by the control circuit, a color distribution map of aggregate pixels associated with each body part of the one or more body parts of the first human on the first image. For example, each color distribution map may be used by the control circuit to differentiate between the first human and another human in the first image. By one approach, the method may include causing, by the control circuit, a database to store the color distribution map for each body part of the first human on the first image. In one scenario, the database may include one or more color distribution map sets each associated with a detected human in a captured image of the camera.

In some embodiments, a system for automatic identification of a retail associate on an image captured by a camera via analysis of color distribution maps associated with aggregate pixels of each body part of a detected human in the captured image at an area of a retail store comprising a camera capturing, at a first time, a first image of an area at a retail store. In some embodiments, the system includes a control circuit coupled to the camera. By one approach, the control circuit may receive the first image. In some embodiments, the control circuit detects a plurality of key body joints for each human captured on the first image. For example, each of the plurality of key body joints is a point of interest along a human skeletal anatomy. In some embodiments, the control circuit, in response to the detection of the plurality of key body joints, determines segmentations of the plurality of key body joints to determine one or more body parts of a corresponding human. In some embodiments, the control circuit determines a color distribution map of aggregate pixels associated with each body part of the one or more body parts of the corresponding human on the first image. For example, each color distribution map may be used by the control circuit to differentiate between one human from another human in the first image. In some embodiments, the control circuit may calculate, for each human in the first image, a correlation value for each color distribution map associated with each body part of the corresponding human on the first image with a stored color distribution map for each body part of a reference retail associate to identify whether the corresponding human is a retail associate of the retail store. In some embodiments, the control circuit may determine that the corresponding human in the first image is the retail associate of the retail store based on a determination that each calculated correlation value is equal to at least a correlation threshold.

In some embodiments, a method for automatic identification of a retail associate on an image captured by a camera via analysis of color distribution maps associated with aggregate pixels of each body part of a detected human in the captured image at an area of a retail store comprising capturing, at a first time by a camera, a first image of an area at a retail store. By one approach, the method may include receiving, by a control circuit coupled to the camera, the first image. In some embodiments, the method includes detecting, by the control circuit, a plurality of key body joints for each human captured on the first image. By one approach, each of the plurality of key body joints is a point of interest along a human skeletal anatomy. In some embodiments, the method includes, in response to the detection of the plurality of key body joints, determining segmentations of the plurality of key body joints to determine one or more body parts of the corresponding human. In some embodiments, the method includes determining, by the control circuit, a color distribution map of aggregate pixels associated with each body part of the one or more body parts of the corresponding human on the first image. By one approach, each color distribution map may be used by the control circuit to differentiate between one human from another human in the first image. In some embodiments, the method may include calculating, by the control circuit and for each human in the first image, a correlation value for each color distribution map associated with each body part of the corresponding human on the first image with a stored color distribution map for each body part of a reference retail associate to identify whether the corresponding human is a retail associate of the retail store. In some embodiments, the method may include determining, by the control circuit, that the corresponding human in the first image is the retail associate of the retail store based on a determination that each calculated correlation value is equal to at least a correlation threshold.

To illustrate, FIGS. 1 through 17 are described below. FIG. 1 illustrates a simplified block diagram of an exemplary system 100 for detecting and tracking humans and distinguishing a customer from an associate or employee from one image to another image in accordance with some embodiments. By one approach, the system 100 includes one or more cameras 104. In one example, the camera 104 may capture, at a first time, one or more images 108 of an area at a retail store. In another example, a plurality of cameras is distributed throughout the retail store. In such an example, each camera is assigned to capture images of a particular area of the retail store. In one configuration, the camera 104 may include a box camera, a dome camera, a PTZ camera, a bullet camera, an IP camera, a day/night camera, a thermal camera, a wireless IP camera, and/or a closed-circuit television (CCTV) camera. In another configuration, an area of a retail store may include an exit, an entrance, an aisle, a bakery area, a frozen area, a customer service area, a food area, a produce area, a meat area, and/or a refrigerated area, to name a few.

In some embodiments, the system 100 includes one or more control circuits 102. In one configuration, a control circuit 102 may include a computer, a server, a processor, a central processing unit, an electronic circuitry within a computer that executes instructions that make up a computer program, a distributed computing network, a cloud computing network, a microprocessor, an electronic device including electrical components, and/or the like. Alternatively or in addition to, the system 100 may include a database 106. For example, the database 106 may include a random access memory, a read only memory, a memory storage, a volatile memory, a non-volatile memory, a solid-state drive, a hard disk drive, a cloud-storage system, and/or any commercially available electronic storage devices capable of storing computer data electronically. In such an implementation, the database 106 may be local to the retail store and/or accessed via a wired and/or wireless network (e.g., Internet, WiFi, LAN, WAN, etc.). By one approach, the control circuit 102 may receive a first image from the camera 104. In such an approach, the control circuit 102 may process the first image to detect a plurality of key body joints 110 of a first human captured on the first image. In some embodiments, in response to the detection of the plurality of key body joints 110, the control circuit 102 may determine segmentations of the plurality of key body joints 112 of the first human to determine one or more body parts of the first human.

In some embodiments, the detection 110 and/or the segmentation 112 of a plurality of key body joints may be executed by the control circuit 102 simultaneously, in series, and/or in parallel. In some embodiments, the control circuit 102 may perform detection 110 and/or segmentation 112 of a plurality of key body joints using publicly and/or commercially available digital and/or image processing techniques, such as top-down estimation techniques, bottom-up techniques, pose estimation techniques using Part Affinity Field (PAF) mapping, and/or human pose estimation via deep neural networks, to name a few. In an illustrative non-limiting example, the detection 110 and/or segmentation 112 of a plurality of key body joints may include the algorithm described in the online article titled "NeuroNuggets: Understanding Human Poses in Real-Time" by Sergey Nikolenko on Apr. 24, 2018 and/or similar pose estimation techniques that are publicly and/or commercially available, the contents of which are hereby incorporated in their entirety by this reference. By one approach, once the key body joints are detected and segmented into body parts, the control circuit 102 determines a color distribution/histogram map 116 of aggregate pixels associated with each body part of the first human. For example, the control circuit 102 determines the color distribution of the pixels corresponding to each body part in an image. In such an example, the control circuit 102 may determine which color does each pixel in the corresponding body part in the image corresponds. Alternatively or in addition to, the control circuit 102 may create and/or cause to store a color distribution map corresponding to the determined colors of the aggregate pixels in the corresponding body part. By one approach, each color distribution map may be used by the control circuit 102 to differentiate between a human in one image and another human in a subsequent image. By another approach, the color distribution map may be used by the control circuit 102 to differentiate between and/or track humans in one or more subsequent images. For example, based on a color distribution map of a body part and/or one or more color distribution maps of a plurality of body parts, the control circuit 102 may determine that a human in a previous image is the same human in a subsequent image. To illustrate, the control circuit 102 may access the existing/stored/reference histogram/distribution maps 118 stored in the database 106. These existing/stored/reference histogram/distribution maps may be previously determined by the control circuit 102 in one or more previous images. By another approach, the existing/stored/reference histogram/distribution maps may have been previously determined in a previous image captured at a period of time (e.g., a millisecond, a couple of milliseconds, longer than a millisecond, a second, longer than a second, etc.) prior to capturing a subsequent image and/or a current image. The existing/stored/reference histogram/distribution maps 118 may be associated with a plurality of body parts and/or a plurality of detected and/or segmented key body joints.

In some embodiments, a color distribution map determined by the control circuit 102 in a current image may be matched and/or compared 120 with one or more of the existing/stored/reference histogram/distribution maps 118. For example, a color distribution map corresponding to a body part in a current image may be matched and/or compared 120 with one or more of the existing/stored/reference histogram/distribution maps 118 associated with one or more corresponding body parts. In some embodiments, the control circuit 102 may perform matching optimization 122. By one approach, in the matching optimization 122, a color distribution map of a particular body part in a current image may be matched and/or compared 120 with each of the existing/stored/reference histogram/distribution maps 118 corresponding to a plurality of body parts to determine which one of the existing/stored/reference histogram/distribution maps 118 substantially matches with a color distribution map corresponding to a body part in a current image. In some embodiments, when a set of color distribution maps corresponding to body parts of a human in a current image substantially matches and/or matches within a particular threshold with a set of color distribution maps of the existing/stored/reference histogram/distribution maps 118, the control circuit 102 may determine that the previously detected human associated with the set of color distribution maps of the existing/stored/reference histogram/distribution maps 118 are the same human associated with the set of color distribution maps corresponding to body parts of the human in the current image. In some embodiments, upon a determination that the human in a current image is the same as the previously detected human in a previously captured image, the control circuit 102 may merge and/or update 114 the set of color distribution maps of the existing/stored/reference histogram/distribution maps 118 corresponding to body parts of the previously detected human in the previously captured image with the set of color distribution maps corresponding to body parts of the currently detected human in the current image. Thus, the control circuit 102 may determine with a particular confidence whether a particular human is in subsequently captured one or more images even if those images were subsequently captured between a time period that is longer than conventionally acceptable to conventional technologies that detect and track humans in captured images. For example, the camera 104 may be set to capture each image every second and/or every multiple seconds (e.g., 2 seconds, 3 seconds, 4 seconds, 5 seconds, etc.). In some embodiments, although images may be captured every multiple seconds, the control circuit 102 may determine whether one or more of the detected humans in a previously captured image are in the currently captured image even though the two images were captured multiple seconds apart based on a matching of the color distribution maps of each body part in the previously captured image and the currently captured image. As such, the use of the color distribution maps as described herein provide multiple benefits and/or improvements in the detection and/or tracking of humans in captured images. By one approach, the control circuit 102 may process images less frequently than conventionally done to detect and/or track humans in captured images. By another approach, the processing power required to detect and/or track humans may be lessened and/or decreased. By another approach, the detection and/or tracking of humans may be performed with a particular confidence level and/or fine-tuned based on a level of desired performance. By another approach, the use of the color distribution maps provides a better occlusion detection by the control circuit 102. Thus, the control circuit 102 may still identify a human that is occluded by another human in an image even though only a portion of the body parts of the occluded human may be shown in the image. Additionally, the use of the color distribution maps as described herein provide a benefit of automatically distinguishing a customer from an associate/employee from one image to another image. Those skilled in the art will recognize a wide variety of benefits and/or improvements provided with respect to the described embodiments herein without departing from the scope of the invention, and that such benefits and/or improvements are to be viewed as being within the ambit of the inventive concept.

Figure 2:
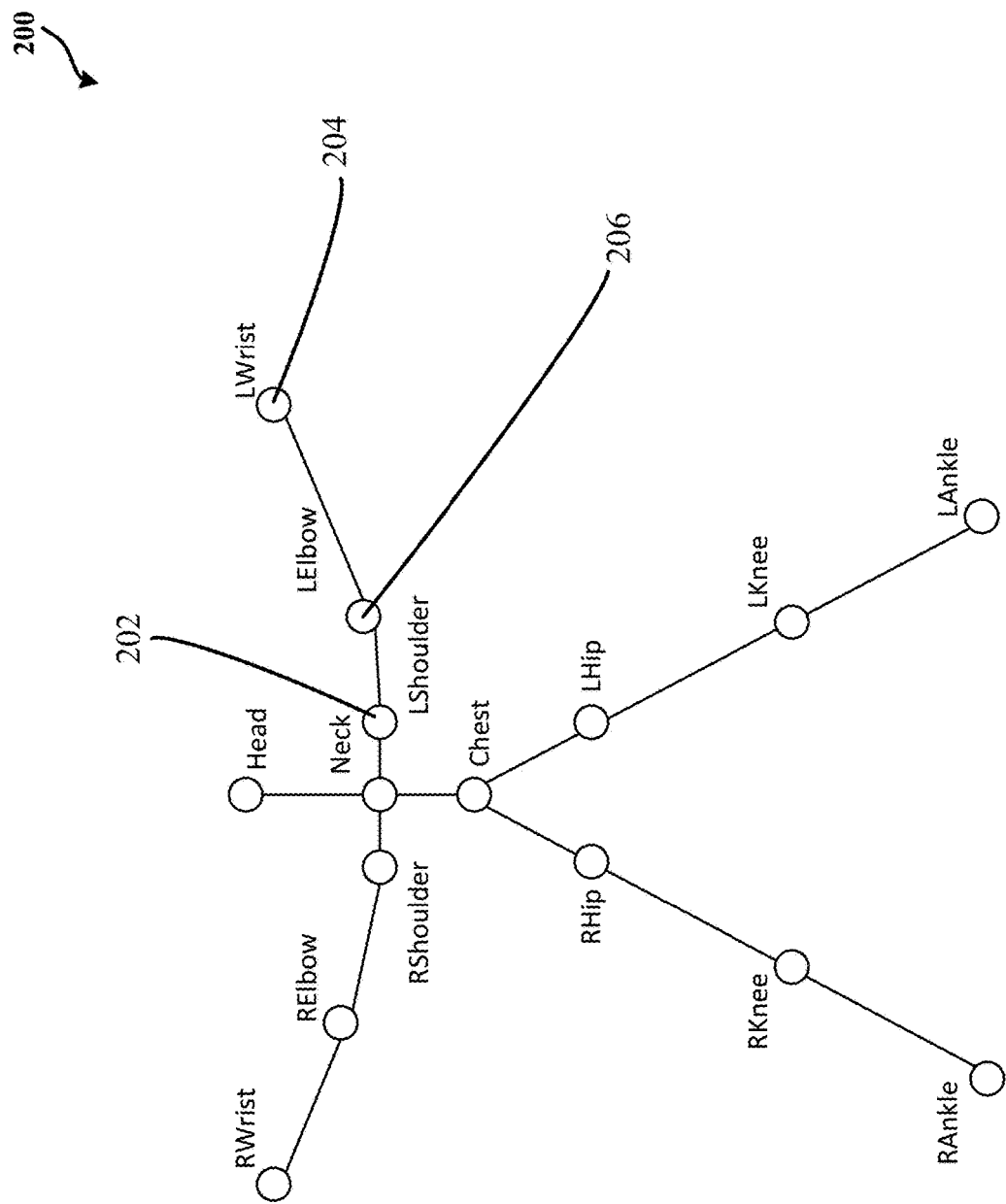
FIG. 2 is a simplified illustration of exemplary key body joints in accordance with some embodiments.
Figure 3:
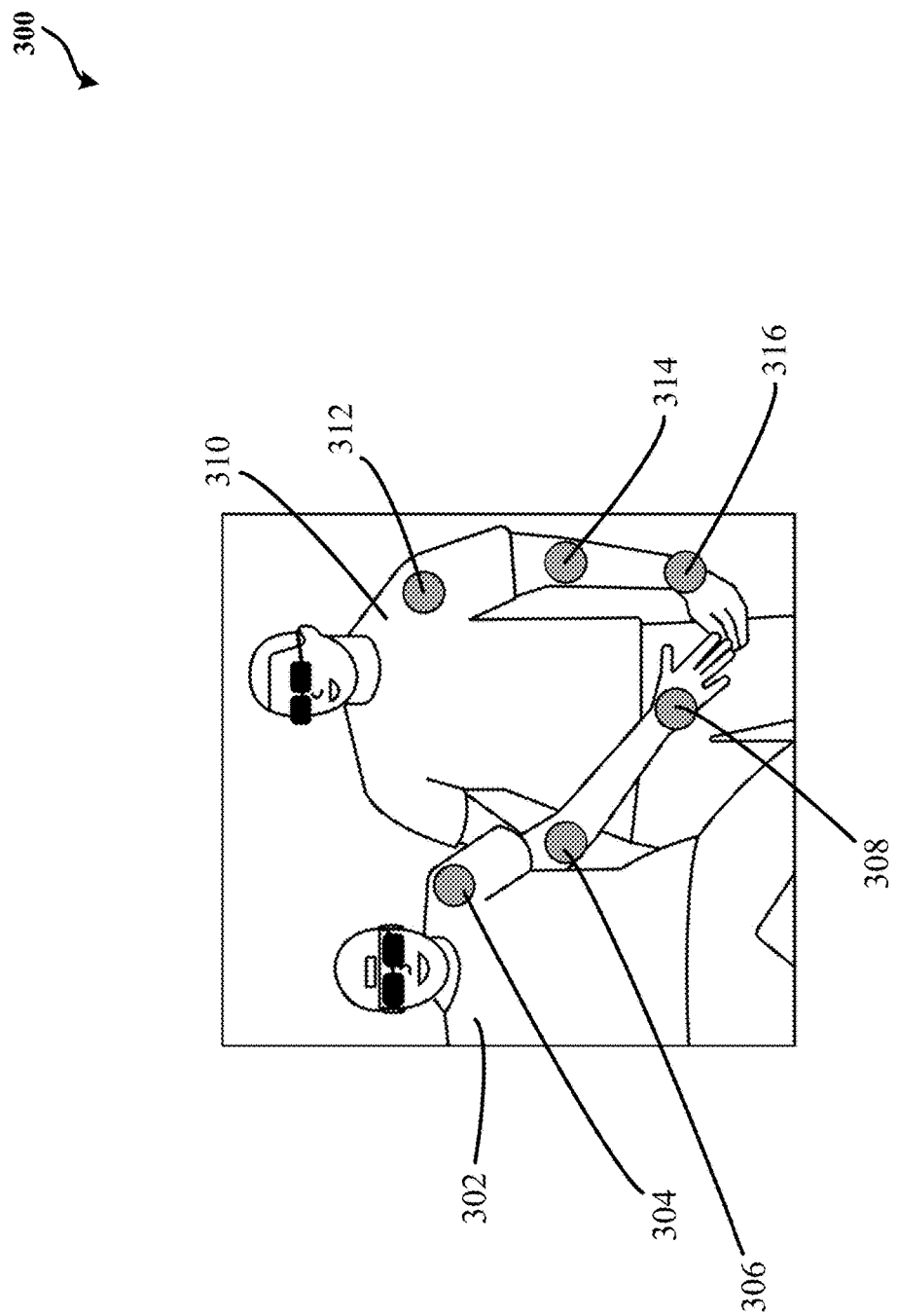
FIG. 3 is a simplified illustration of an exemplary detection of key body joints in accordance with some embodiments.

FIG. 2 is a simplified illustration of exemplary key body joints 200 in accordance with some embodiments. By one approach, the key body joints detection 110 in FIG. 1 may result in the detection of key body joints shown in FIG. 2. For example, a number of key body joints of a detected human are shown in FIG. 2, such as Left Shoulder 202, Left Elbow 206, and Left Wrist 204, to name a few. In FIG. 2, the letter R and L in front of a particular body part corresponds to "right" and "left" respectively. For example, RHip corresponds to right hip while LHip corresponds to left hip. In some embodiments, each of the key body joints may correspond to a point of interest along a skeletal anatomy of a human, as shown in FIG. 2. In another illustrative non-limiting example, FIG. 3 is a simplified illustration of an exemplary detection of key body joints 300 in accordance with some embodiments. For example, FIG. 3 illustrates the detected key body joints of two humans 302, 310 in a captured image. In some embodiments, three key body joints are detected by the control circuit 102 for each human 302, 310. For example, a left shoulder 304, a left elbow 306, and a left wrist 308 are detected for the first human 302. In another example, a left shoulder 312, a left elbow 314, and a left wrist 316 are detected for the second human 310.

Figure 4:
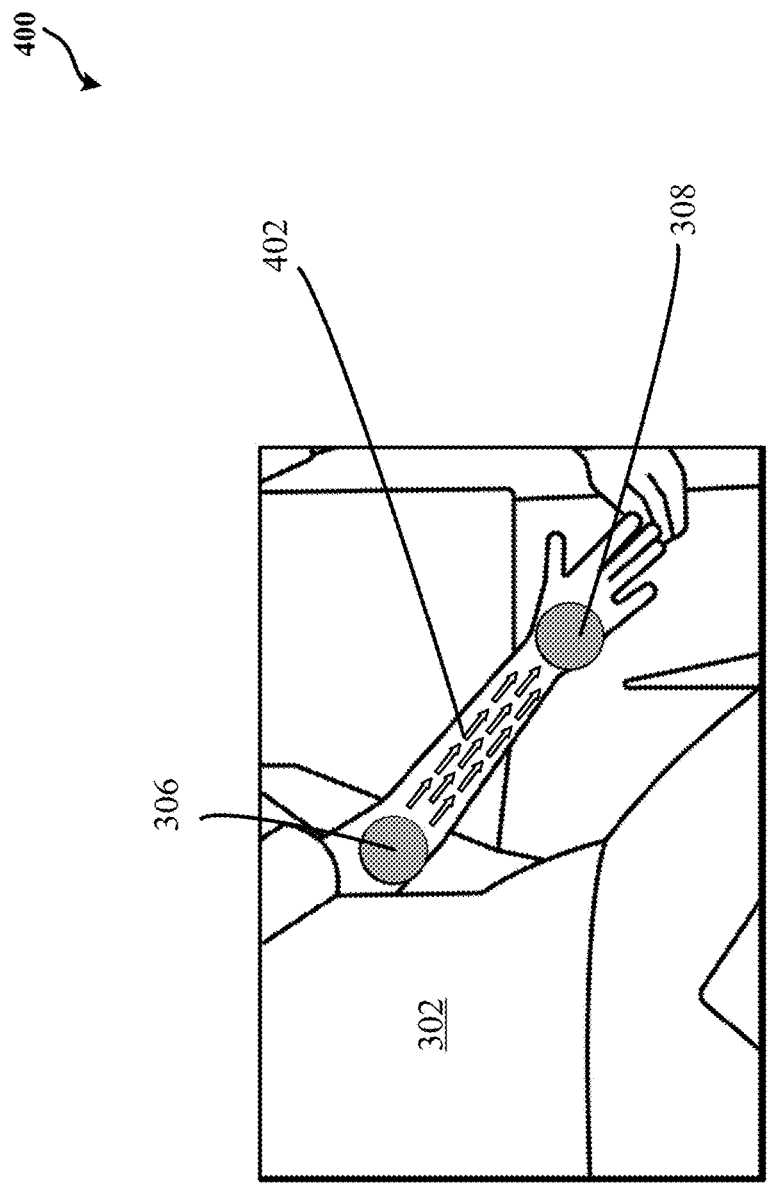
FIG. 4 is a simplified illustration of an exemplary segmentation of key body joints in accordance with some embodiments.

FIG. 4 is a simplified illustration of an exemplary segmentation of key body joints 400 in accordance with some embodiments. In an illustrative non-limiting example, as shown in FIG. 4, a left forearm 402 of the first human 302 of FIG. 3 may be determined based on the segmentation of the left elbow 306 and the left wrist 308. In some embodiments, the segmentations of key body joints in FIG. 4 may correspond to the segmentation 112 of key body joints in FIG. 1. For example, the control circuit 102 may determine segmentations 112 of key body joints in an image to determine one or more body parts that may be associated with one or more humans captured in the image. In such an example, a segmentation of key body joints may correspond to determining which two or more groupings of key body joints form one or more body parts associated with a human in a captured image. For example, body parts may include a pair of feet, a head, a hand, a hip, a pair of arms, a torso, a pair of thighs, a pair of entire legs, a neck, a pair of forearms, and a shoulder, to name a few. In such an example, two key body joints, such as a wrist and an elbow, may be segmented to form a forearm of a human in a captured image, for example, the left forearm 402 in FIG. 4. In some embodiments, segmentation of key body joint to form and/or determine a body part, such as the left forearm 402, by the control circuit 102 may be based in part on Part Affinity Field (PAF) mapping techniques.

Figure 5:
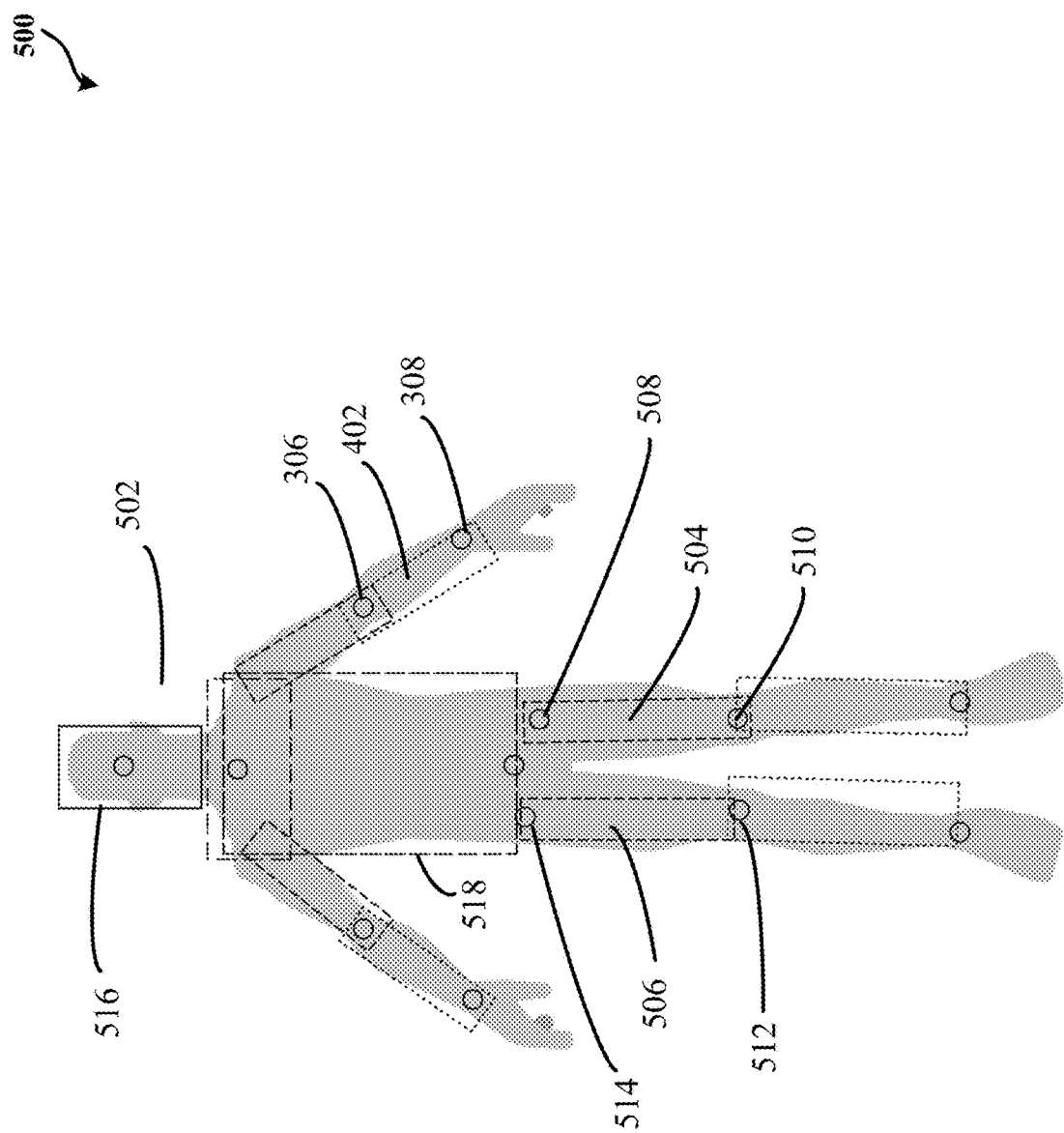
FIG. 5 is a simplified illustration of exemplary segmentations of key body joints to determine body parts of a human in accordance with some embodiments.

FIG. 5 is a simplified illustration of exemplary segmentations 500 of key body joints in accordance with some embodiments. In an illustrative non-limiting example in FIG. 5, the control circuit 102 may determine each key body joints and perform segmentations of the determined key body joints to identify different body parts of a human 502 (e.g., thigh, forearm, head, forearm, torso, etc.). For example, the body parts of the human 502 may be segmented by the control circuit 102. For example, two key body joints, such as a knee (e.g., a left knee 510, a right knee 512) and a hip (e.g., a left side hip 508, a right side hip 514) may be segmented to determine and/or identify a body part, such as a thigh of the human 502 (e.g., a left thigh 504, a right thigh 506, respectively). In another example, the human 502 may correspond to the human 302 in FIGS. 3 and 4. In such an example, a body part, such as the left forearm 402, may be identified by the control circuit 102 as illustrated by a dotted rectangular box including the left elbow 306 and the left wrist 308.

In some embodiments, the captured images may include one or more image resolutions. By one approach, a number of pixels in an image may depend on the resolution associated with the camera 104 that captured the image. The captured images are pixelated and the size of each pixel depends on the resolution of the camera 104. As such, each of the determined body parts is associated with a particular set of aggregate pixels. For example, each identified body part in the segmentations 500 of FIG. 5 may be associated with a particular set of aggregate pixels. In some embodiments, the control circuit 102 may determine a color distribution map of aggregate pixels associated with each determined and/or identified body part. For example, the human 502 in FIG. 5 may be wearing clothes with different colors and/or shade of colors. As such, in an image capture of the human 502, the left thigh 504 may be associated with a first set of aggregate pixels while the left forearm 402 may be associated with a second set of aggregate pixels. Thus, each body part of a human in an image may correspond to a particular set of aggregate pixels. By one approach, each set of aggregate pixels may be associated with a particular color distribution map particular to the body part corresponding to the aggregate pixels.

In an illustrative non-limiting example, the control circuit 102 may determine a color distribution map of the second set of aggregate pixels associated with the left forearm 402. In such an embodiment, the control circuit 102 may determine the color distribution of red, green, and/or blue colors and/or any combination of one or more primary colors, secondary colors, tertiary colors, and so forth in the left forearm 402. In another illustrative non-limiting example, the color distribution map of the forearm of the human 302 of FIG. 3 and the color distribution map of the forearm of the human 310 of FIG. 3 are different, such that the color distribution of red, green, and/or blue colors is different for the human 302 as compared to the human 310 due in part to differences in their skin complexion. In another example, the color distribution of each body part of one human may be different compared to the color distribution of each corresponding body part of another human because of the clothes, jewelries, accessories, and/or watches each may be wearing. In yet another example, each human in an image may have substantially different overall color distribution when compared to another human in the same and/or another image because each human would be wearing a different combination of clothing, jewelries, watches, and/or accessories that are of different types, colors, and/or shadings of colors, thereby rendering his/her own total distribution of red, green, and/or blue colors and/or any combination of colors different. Thus, for example, even if two detected humans in an image are wearing the same type of jeans but wearing different shirts (e.g., length, type, color, etc.), the control circuit 102 may determine that a left thigh of the first human has substantially the same color distribution map as the left thigh of the second human. However, the control circuit 102 may also determine that the arm of the first human has different color distribution map compared to the arm of the second human due to the fact that they are wearing different shirts. As such, the overall color distribution map of the body parts of the first human is different from the overall color distribution map of the body parts of the second human because of at least the difference in the shirt that each of them wears.

Figure 6:
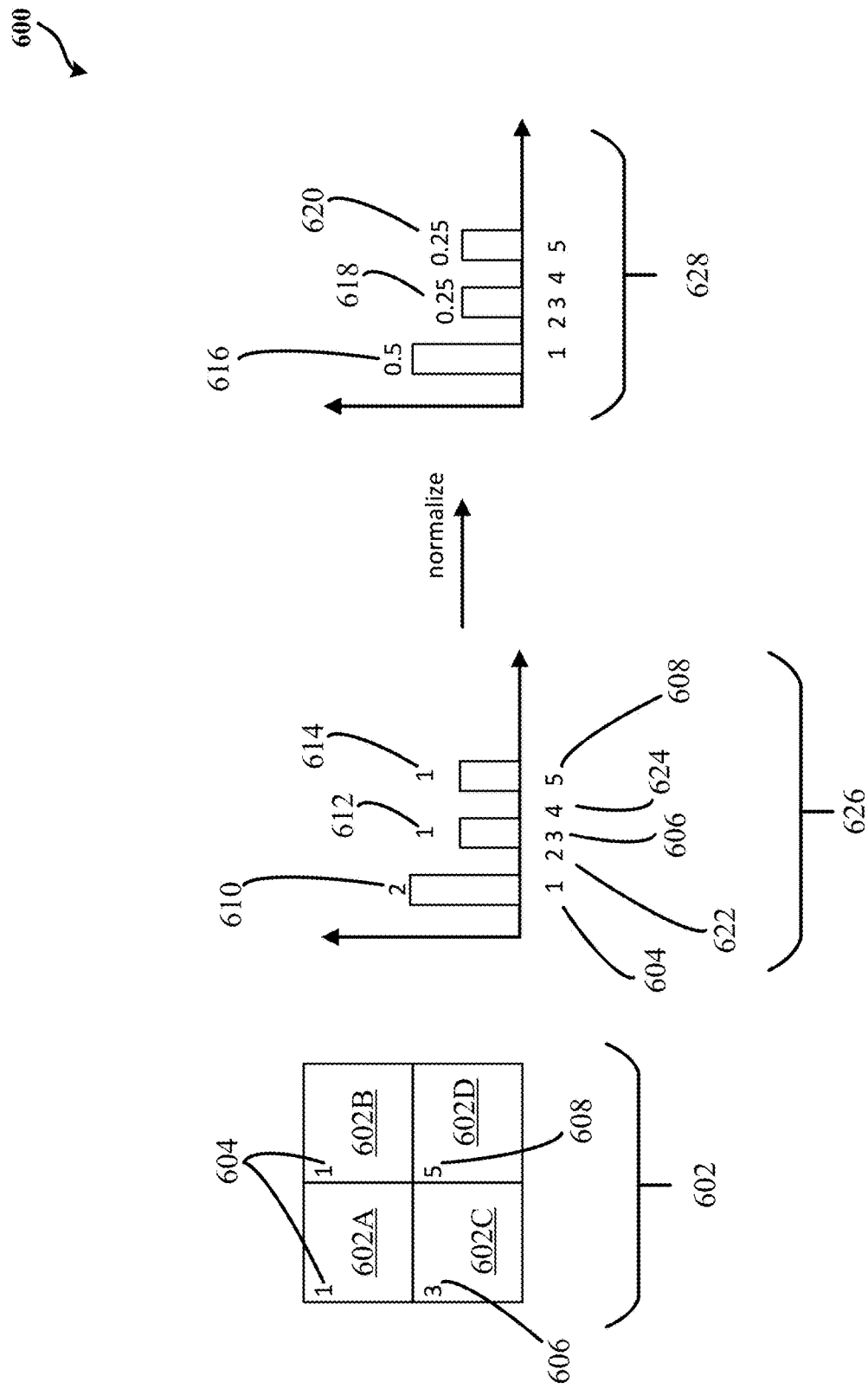
FIG. 6 is a simplified illustration of an exemplary determination of a color distribution map of a body part in accordance with some embodiments.

In some embodiments, the control circuit 102 may evaluate each pixel and/or determine the one or more colors that correspond to the pixel. In some embodiments, each pixel may be of a size where it may substantially correspond to just one particular color. In an illustrative non-limiting example, FIG. 6 is a simplified illustration of an exemplary determination of a color distribution map 600 of a body part. In an illustrative non-limiting example and for simplicity purposes, let us consider that a body part 602 corresponds to the left forearm 402 of the human 302 of FIG. 4. The body part 602 may be pixelated into 4 pixels: 602A, 602B, 602C, 602D. Pixels 602A and 602B may be associated with a first color 604. Pixel 602C may be associated with a third color 606. Pixel 602D may be associated with a fifth color 608. In some embodiments, each color (e.g., the first color 604, the third color 606, the fifth color 608, etc.) may be represented by a range of values between 0 through 255 and/or any range of values to effectively define a color in a color space. In some embodiments, in an RGB color space, a color may be represented by a value based on a particular color intensity (e.g., how red is a particular pixel). By one approach, in addition to the RGB color space, the color space may include HSL (hue, saturation, lightness), HSV (hue, saturation, value), and CIELAB color space (L for lightness from black to white, A from green to red, B from blue to yellow). In an illustrative non-limiting example and for simplicity of explanation, the first color 604 may correspond to a red color. In another embodiments, the third color 606 may correspond to a green color. In another embodiments, the fifth color 608 may correspond to a blue color. In yet another embodiments, a second color 622 may correspond to a yellow color. In yet another embodiments, a fourth color 624 may correspond to an orange color. By one approach, to determine a color distribution map 626 of the body part 602, the control circuit 102 may determine the associated color of each pixel. In some embodiments, the control circuit 102 may determine the total number of pixels that are associated with each determined color. For example, the color distribution map 626 may show that the first color 604 has a first total number of pixels 610, the second color 622 and the fourth color 624 have zero corresponding number of pixels, the third color 606 has a third total number of pixels 612, and the fifth color 608 has a fifth total number of pixels 614. In some embodiments, the control circuit 102 may normalize all counted total number of pixels for each color. As shown in FIG. 6, for example, the color distribution map 626 may be transformed into a normalize color distribution map 628. In some embodiments, the control circuit 102 may sum the total number of pixels and determine, for each color 604, 622, 606, 624, 608, the corresponding normalize value for the number of pixels associated with the color relative to the sum of the total number of pixels associated with the body part 602. For example, the control circuit 102 may divide the total number of pixels of a particular color by the sum to get the normalize value for that particular color. For example, a first normalize value 616 is associated with the first color 604, a third normalize value 618 is associated with the third color 606, and a fifth normalize value 620 is associated with the fifth color 608. In some embodiments, the control circuit 102 may represent the color distribution map 626 or the normalize color distribution map 628 as a color histogram as shown in FIG. 6.

Figure 7:
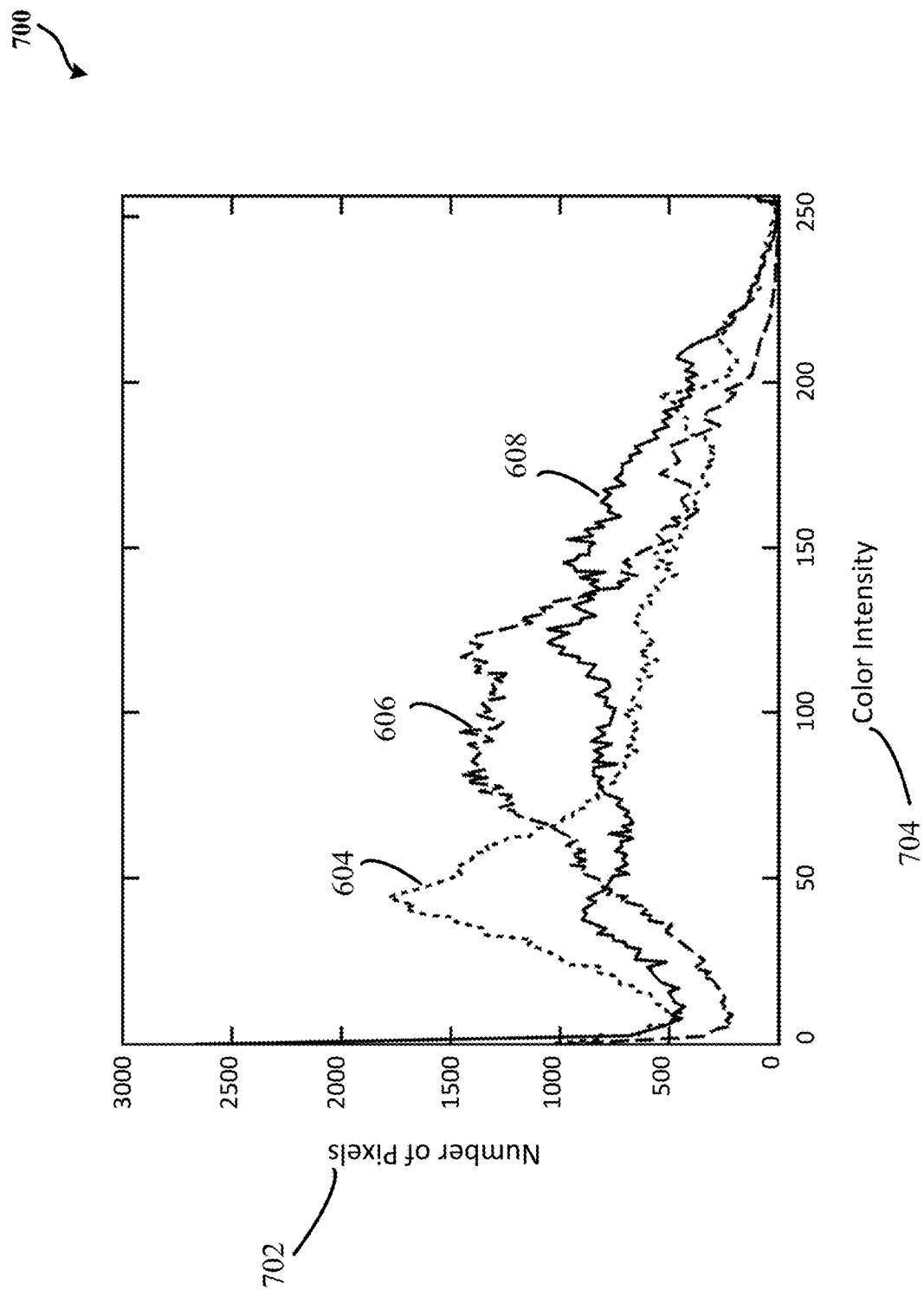
FIG. 7 is a simplified illustration of a two-dimensional (2D) graphical representation of an exemplary color distribution map in accordance with some embodiments.

In some embodiments, a color distribution map of a body part may be represented as a one-dimensional (1D) graphical representation 700 as illustrated in FIG. 7. In some embodiments, a color distribution map of a body part may be represented as a two-dimensional (2D) and/or a three-dimensional (3D) graphical representations (not shown). In some embodiments, each color distribution map of each body part of a human may be stored in the database 106. In some embodiments, the storage of the color distribution maps comprises a matrix configuration, data corresponding to the color distribution map, and/or any database format and/or configuration that is capable to be managed, accessed, and updated. In some embodiments, the database 106 may store each color distribution map for each body part and/or associate each body part to a corresponding human, and/or corresponding image. In some embodiments, the database 106 may store data corresponding to the normalized color distribution map and/or total number of pixels associated with the normalized color distribution. In an illustrative non-limiting example, the 1D graphical representation 700 is described. In some embodiments, a color distribution map of a body part may be represented as a 2D graphical representation and/or a 3D graphical representation. Those skilled in the art will recognize that a color distribution map of a body part may be represented in one or more various graphical representations without departing from the scope of the invention and are to be viewed as being within the ambit of the inventive concept. In some embodiments, the 1D graphical representation 700 may include an x-axis 702 (e.g., number of pixels) and a y-axis 704 (e.g., color intensity). For example, FIG. 7 illustrates an example color distribution map of the first color 604, the third color 606, and the fifth color 608. As illustrated in FIG. 7, the color distribution for each of the first color 604, the third color 606, and the fifth color 608 varies based on the location of the pixels in the captured image. In this illustrative non-limiting example, at about location 50 of the image, the number of pixels associated with the first color 604 is substantially greater than those number of pixels associated with the third color 606 and the fifth color 608. As such, when the color distribution map of the body part represented by the 2D graphical representation 700 is compared to another color distribution map of a corresponding body part and that the resulting comparison provided a high correlation (e.g., a correlation value of equal to and/or greater than a predetermined threshold value, for example, 0.8 or any value set to be the threshold value), the control circuit 102 may determine that the compared body parts belonged to the same human. Alternatively or in addition to, if the comparison resulted in a low correlation (e.g., a correlation value of less than and/or equal to a predetermined threshold value), the control circuit 102 may determine that the compared body parts belonged to different humans. Thus, the control circuit 102 determines a color distribution map of aggregate pixels associated with each body part associated with each human in each of the captured images and compares each determined color distribution of one image to each of the determined color distributions of another image to determine whether a detected human in one image is still captured in subsequent images. As such, the control circuit 102 may determine whether a particular human is in an area within a field of view of the camera that captured the images. In some embodiments, the control circuit 102 may determine a period of time that the particular human remained in the area. In some embodiments, the control circuit 102 may use the normalized color distribution maps to determine and/or calculate a corresponding correlation value.

Figure 8:
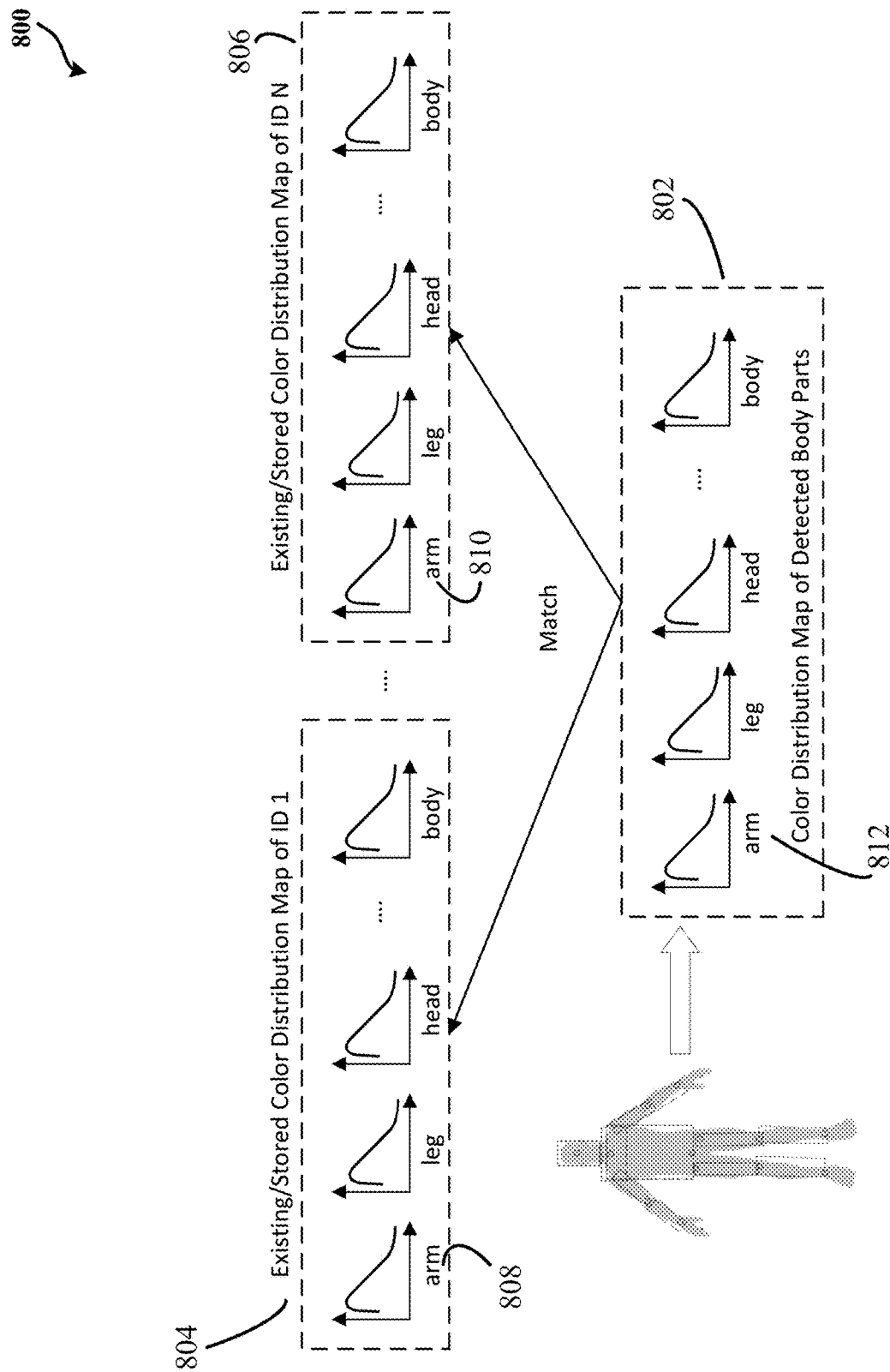
FIG. 8 is a simplified illustration of an exemplary matching of color distribution maps of detected body parts with color distribution maps of stored/existing/reference body parts in accordance with some embodiments.

FIG. 8 is a simplified illustration of an exemplary matching 800 of detected and/or identified body parts with stored/existing/reference body parts in accordance with some embodiments. By one approach, the exemplary matching 800 may correspond to the matching 120 of FIG. 1. In an illustrative non-limiting example, the matching 800 illustrates that a set of color distribution maps 802 of detected and/or identified body parts is compared and/or matched to a plurality of a set of color distribution maps 804, 806 associated with a plurality of detected humans (e.g., ID 1 and ID N). In an illustrative non-limiting example, the control circuit 102 may compare and/or match a color distribution map 812 of the set of color distribution maps 802 to each color distribution map of the corresponding body part (e.g., an arm) in the stored/existing/reference color distribution maps in the database 106, such as a color distribution map 808 of the set of color distribution maps 804 of a human associated with ID 1 and a color distribution map 810 of the set of color distribution maps 806 of a human associated with ID N.

Figure 9:
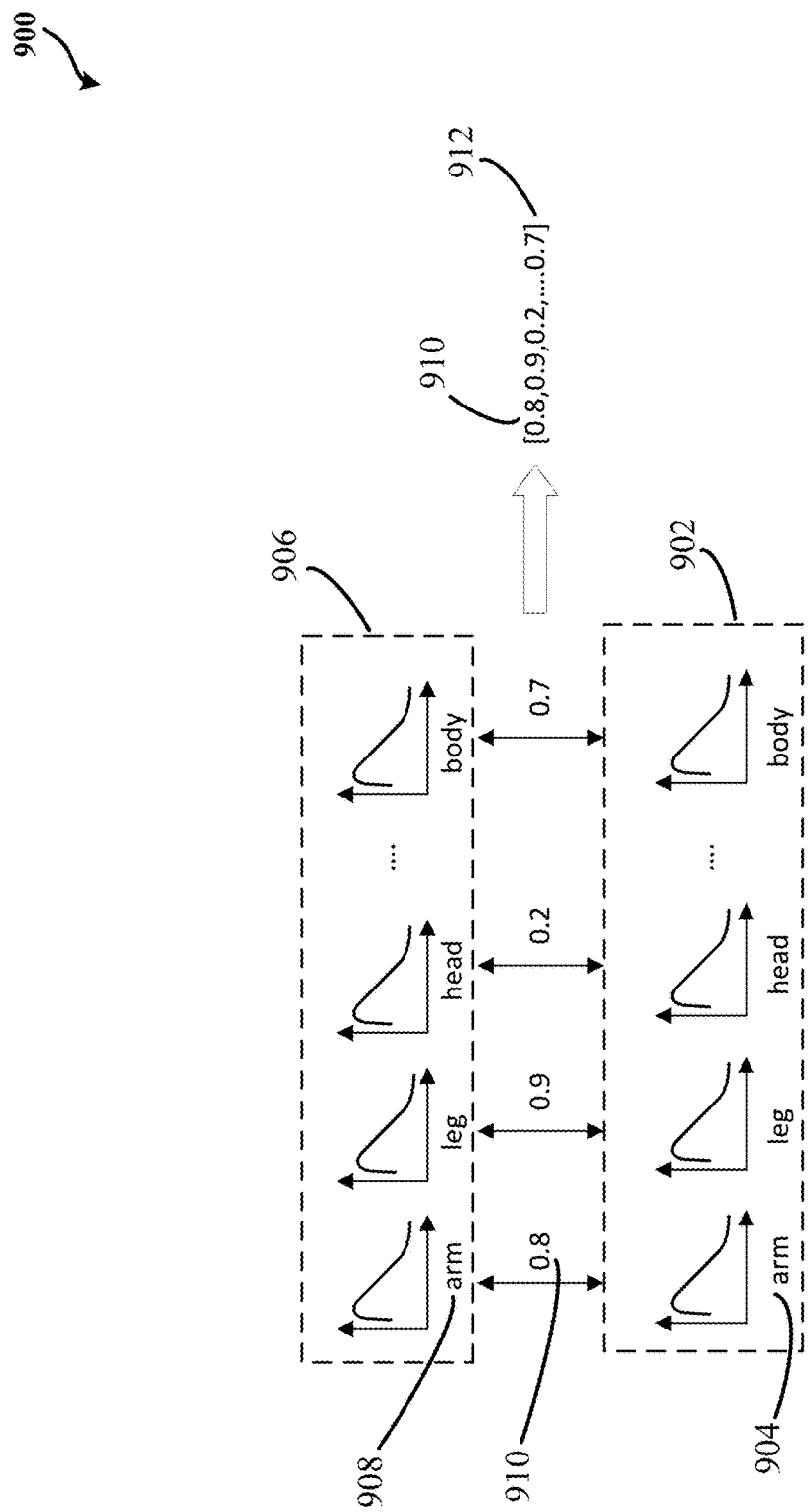
FIG. 9 is a simplified illustration of an exemplary matching vector in accordance with some embodiments.

In some embodiments, in comparing and/or matching the color distribution maps of body parts, the control circuit 102 may determine a correlation value for each comparison of body parts. To illustrate, FIG. 9 is a simplified illustration of a resulting exemplary matching vector 900 in accordance with some embodiments. FIG. 9 illustrates that for each comparison and/or matching between a set of color distribution maps 902 associated with a human detected in a current image and a stored/existing/reference set of color distribution maps 906 associated with a human detected in a previous image, the control circuit 102 may determine a corresponding correlation value. For example, a color distribution map 904 corresponding to an arm in the set of color distribution maps 902 is compared/matched by the control circuit 102 with a color distribution map 908 associated with a corresponding body part (e.g., an arm) in the set of color distribution maps 906 by determining a correlation value 910. In response to determining the correlation value for each corresponding body part of the set of color distribution maps 902 and the stored/existing/reference set of color distribution maps 906, the control circuit 102 may determine a matching vector 912. For example, the matching vector 912 may include the determined correlation value of each compared/matched body part, such as the correlation value 910 of the arm.

In some embodiments, the control circuit 102 may determine whether each correlation value in a matching vector is at least equal to a correlation threshold to determine that a detected human in a current image is the same human in a previous image. Alternatively or in addition to, the control circuit 102 may determine whether a threshold number of the correlation values in the matching vector is at least equal to the correlation threshold to determine that a detected human in a current image is the same human in a previous image. For example, the control circuit 102 may determine a color distribution map of aggregate pixels associated with each body part a human on a current image. In some embodiments, the control circuit 102 may calculate a correlation value for each color distribution map associated with each body part of the human in the current image with each color distribution map associated with each corresponding body part of a human detected on a previous image. In response, the control circuit 102 may determine that the human in the current image is the same human in the previous image based on a determination that each calculated correlation value is equal to at least a correlation threshold. Alternatively or in addition to, the control circuit 102 may determine that the human in the current image is the same human in the previous image based on a determination that a threshold number of the correlation values associated with each individual distribution map of the set of color distribution maps is equal to at least a correlation threshold. In some embodiments, the control circuit 102 may cause the database 106 to update the previously stored/existing/reference color distribution map set by combining the stored/existing/reference color distribution map set with the color distribution map set of the human in the current image in response to the determination that the human in the current image is the same human in the previous image.

In some embodiments, the control circuit 102 may determine that the human in the current image is not the same human in the previous image based on a determination that one or more of calculated correlation values are not greater than and/or equal to at least the correlation threshold. In such an embodiment, the control circuit 102 may cause the database 106 to store a color distribution map corresponding to each body part of the human in the current image and/or associate each color distribution map corresponding to each body part to the human in the current image. For example, the set of color distribution maps corresponding to the body parts of the human in the current image may be used for comparison/matching by the control circuit 102 with a set of color distribution maps of a human in a subsequent image to determine whether the human in the current image is detected and/or tracked in the subsequent image.

Figure 10:
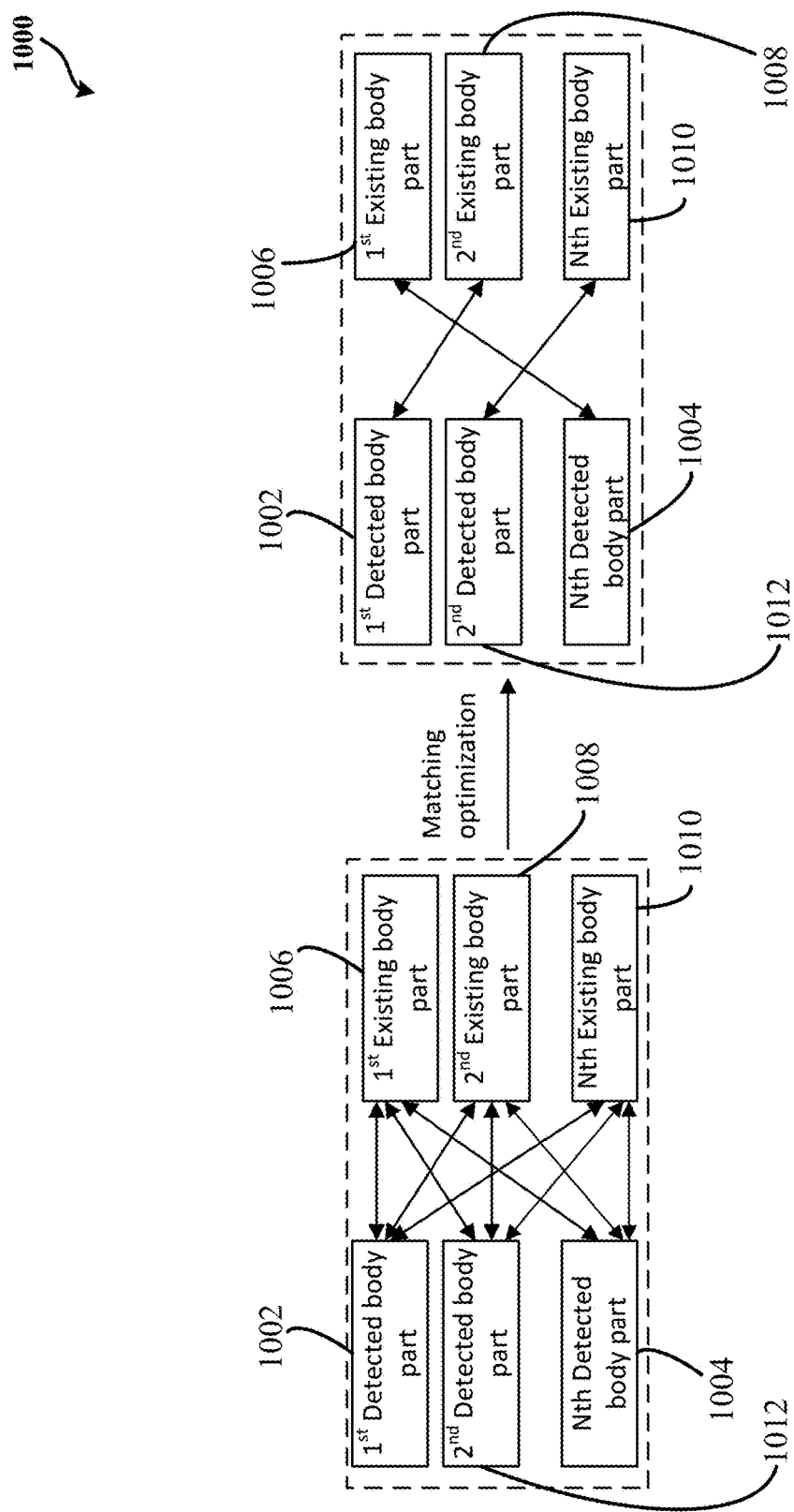
FIG. 10 is a simplified illustration of an exemplary matching optimization of color distribution maps of detected body parts with color distribution maps of stored/existing/reference body parts in accordance with some embodiments.

In some embodiments, the control circuit 102 may determine and/or calculate a correlation value between each color distribution map associated with each body part and a color distribution map associated with each stored/existing/reference body part in the database 106. To illustrate, FIG. 10 is a simplified illustration of an exemplary matching optimization 1000 of detected body parts with stored/existing/reference body parts in accordance with some embodiments. By one approach, the matching optimization 1000 may correspond to the matching optimization 122 of FIG. 1. To illustrate, a $1^{st}$ detected body part 1002, a $2^{nd}$ detected body part 1012, and a Nth detected body part 1004 are shown in FIG. 10. In an illustrative non-limiting example, these body parts are body parts that may have been determined based on the key body joints detection 110 and/or the segmentation of key body joints 112 associated with a human in a current image captured by the camera 104. In some embodiments, a $1^{st}$ existing body part 1006, a $2^{nd}$ existing body part 1008, and a Nth existing body part 1010 are stored in the database 106.

By one approach, the control circuit 102 may determine and/or calculate a first correlation value between a color distribution map associated with the 1st detected body part 1002 and a color distribution map associated with the 1st existing body part 1006. By another approach, the control circuit 102 may determine and/or calculate a second correlation value between the color distribution map associated with the 1st detected body part 1002 and a color distribution map associated with the 2nd existing body part 1008. By another approach, the control circuit 102 may determine and/or calculate a third correlation value between the color distribution map associated with the 1st detected body part 1002 and a color distribution map associated with the 2nd existing body part 1008. Similarly, a corresponding correlation value maybe determined and/or calculated for the 2nd detected body part 1012 and each of the 1st existing body part 1006, the 2nd existing body part 1008, and the Nth existing body part 1010. In some embodiments, another corresponding correlation value maybe determined and/or calculated for the Nth detected body part 1004 and each of the 1st existing body part 1006, the 2nd existing body part 1008, and the Nth existing body part 1010. In some embodiments, in response to determining a correlation value, the control circuit 102 may determine whether the correlation value is at least equal to and/or greater than a correlation threshold. For example, the correlation threshold may include a predetermined value indicating a high likelihood that the compared and/or matched body parts are the same body part belonging to a particular human. Thus, enabling the control circuit 102 to track one or more humans from one image to another image. For example, in response to the determination of the first correlation value, the second correlation value, and the third correlation value, the control circuit 102 may determine which one of the correlation values is at least equal to and/or greater than the correlation threshold to determine whether there is a matched between the compared body parts. Continuing the illustrative non-limiting example in FIG. 10, the control circuit 102 may determine that the 1st detected body part 1002 matches with the 2nd existing body part 1008 based on the determination that the second correlation value is at least equal to and/or greater than the correlation threshold. As shown in FIG. 10, the control circuit 102 may determine that the 2nd detected body part 1012 matches with the Nth existing body part 1010 while the Nth detected body part 1004 matches with the 1st existing body part 1006 based on a determination that each of these matches corresponds to a correlation value that is at least equal to and/or greater than a correlation threshold.

Figure 11:
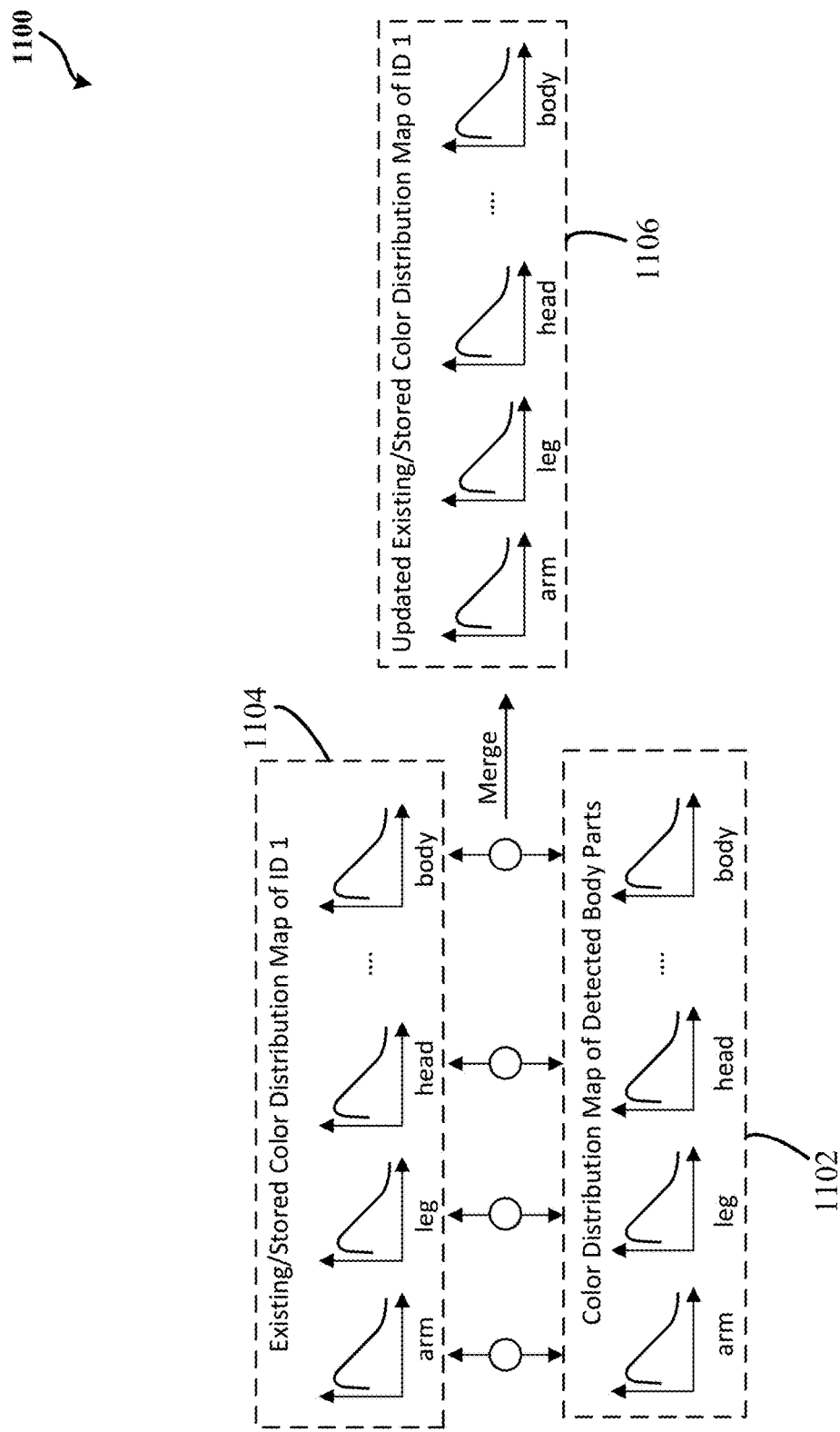
FIG. 11 is a simplified illustration of an exemplary merging of matched color distribution maps of detected body parts and color distribution maps of stored/existing/reference body parts in accordance with some embodiments.

In some embodiments, in response to the control circuit 102 determining that there is a match between color distribution maps and/or a set of color distribution maps of detected and/or identified body parts and existing/stored color distribution maps and/or a set of stored/existing/reference color distribution maps of stored/existing/reference body parts in the database 106, the control circuit 102 may update the stored/existing/reference color distribution maps and/or the set of the stored/existing/reference color distribution maps with the color distribution maps and/or the set of color distribution maps of the detected and/or identified body parts. FIG. 11 is a simplified illustration of an exemplary merging 1100 of matched detected body parts and stored/existing/reference body parts in accordance with some embodiments. In some embodiments, the merging 1100 may correspond to the color histogram/distribution merging 114 of FIG. 1. In some embodiments, the control circuit 102 may determine color distribution maps and/or a set of color distribution maps 1102 of detected body parts of a human in a current image are a match with color distribution maps and/or a set of color distribution maps 1104 of stored/existing/reference body parts associated with a human ID 1 in a previous image. In response, the control circuit 102 may merge and/or update the color distribution maps and/or the set of color distribution maps 1102 with the color distribution maps and/or the set of color distribution maps 1104 resulting in an updated color distribution maps and/or the set of color distribution maps 1106. In some embodiments, the control circuit 102 may initially denormalize the color distribution maps to be merged, perform the merging and/or updating as described herein, and then normalize the updated color distribution map prior to causing the database 106 to store the normalized updated color distribution map. By one approach, one of the plurality of benefits of updating color distribution maps is that the more pixels accumulate, the more stable the normalized reference color distribution/histogram map, thereby providing a better and/or enhanced identification and/or detection of an occluded human in an image by the control circuit 102.

Figure 12:
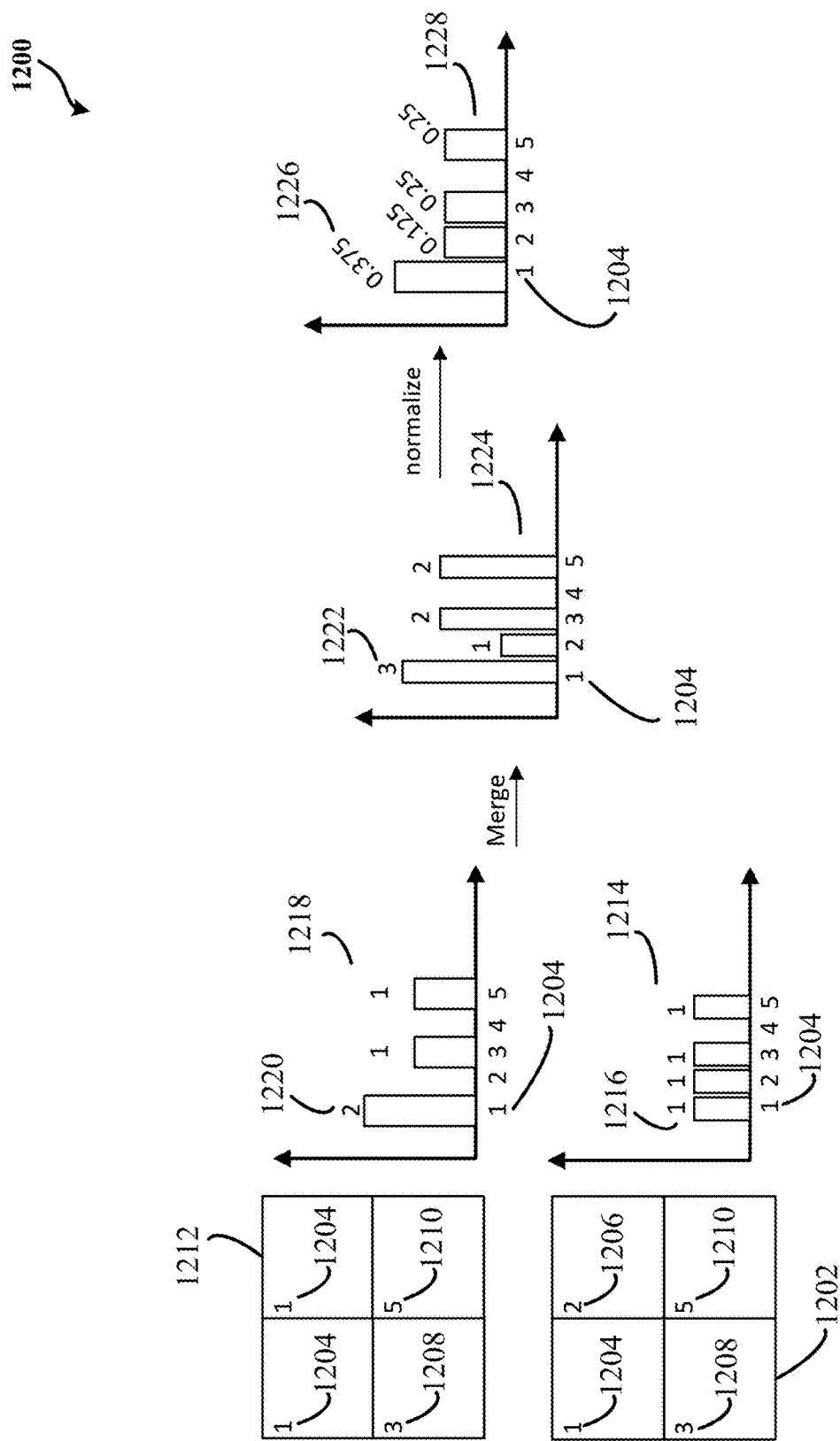
FIG. 12 is a simplified illustration of an exemplary merging of matched histogram maps of detected body parts and histogram maps of stored/existing/reference body parts in accordance with some embodiments.

In an illustrative non-limiting example, FIG. 12 is a simplified illustration of an exemplary merging 1200 of matched histogram maps of detected body parts and histogram maps of stored/existing/reference body parts in accordance with some embodiments. In some embodiments, the control circuit 102 may evaluate a pixelated image of a body part 1202 in a current image captured by the camera 104. For illustration and ease of explanation, the body part 1202 may include four pixels. The four pixels may include a first color 1204, a second color 1206, a third color 1208, a fifth color 1210. The distribution of colors (e.g., the color distribution map) of the pixelated body part 1202 is represented by a histogram map 1214. The number of pixels associated with each color is shown in the histogram map 1214. For example, a first number of pixels 1216 is associated with the first color 1204. In some embodiments, the database 106 may have a stored/existing/reference color distribution map associated with a body part 1212 of a previously captured image. By one approach, the body part 1212 may include four pixels having the first color 1204, the third color 1208, and the fifth color 1210. The distribution of colors (e.g., the color distribution map) of the body part 1212 is represented by a histogram map 1218. The corresponding number of pixels associated with each color of the body part 1212 is shown in the histogram map 1218. For example, a second number of pixels 1220 is associated with the first color 1204.

In some embodiments, in response to a determination that the body part 1202 of a current image and the body part 1212 of a previous image is the same body part, the control circuit 102 may cause the database 106 to update the stored/existing/reference color distribution map associated with the body part 1212 with the color distribution map associated with the body part 1202. For example, in FIG. 12, in response to the determination that the body part 1202 and the body part 1212 are substantially the same body part belonging to the same person, the control circuit 102 causes the database 106 to update the stored/existing/reference histogram map 1218 by combining and/or merging the histogram map 1218 with the histogram map 1214 resulting in a histogram map 1224. By merging, the number of pixels associated with each color associated with the body part 1212 is updated with the number of pixels associated with each color associated with the body part 1202. For example, the first color 1204 is now associated with a third number of pixels 1222 as shown in the histogram map 1224.

In some embodiments, the control circuit 102 may normalize the histogram map 1224. By one approach, the control circuit 102 may sum the updated number of pixels associated with all colors of the body part 1212 and compare the sum to each number of pixels associated with each color in the histogram map 1224. For example, the third number of pixels 1222 is divided by the sum, resulting in a fourth number of pixels 1226. As such, a histogram map 1228 shown in FIG. 12 is a normalized histogram map 1224.

Figure 14:
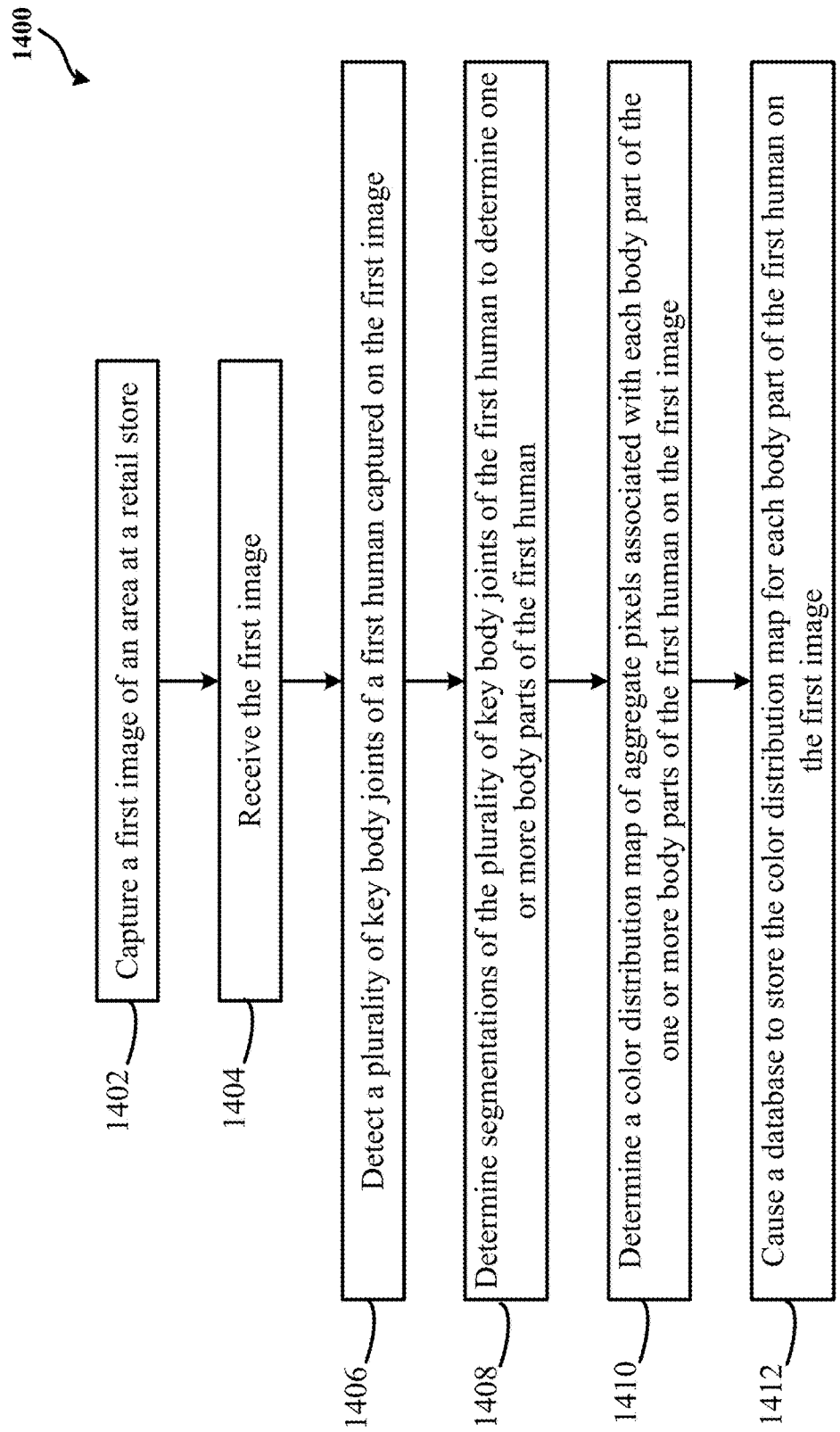
FIG. 14 shows a flow diagram of an exemplary process of detecting and tracking humans from one image to another image in accordance with some embodiments.
Figure 15:
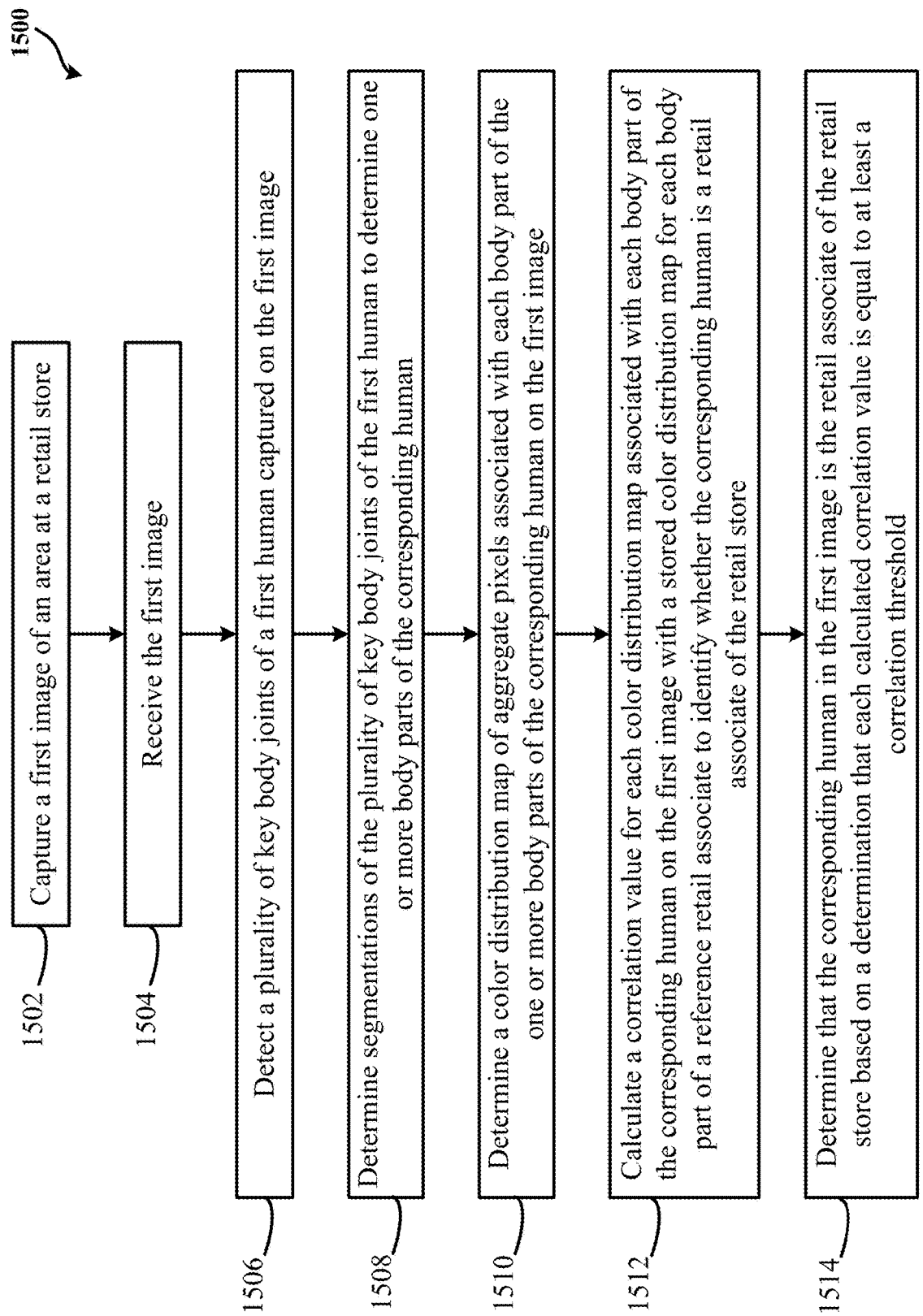
FIG. 15 shows a flow diagram of an exemplary process of distinguishing a customer from an associate or employee from one image to another image in accordance with some embodiments.

FIG. 13 is a simplified illustration of an exemplary detection and tracking and distinguishing a customer from an associate/employee 1300 of humans from one image to another image in accordance with some embodiments. In an illustrative non-limiting example, FIG. 13 illustrates a $1^{st}$ image 1302 captured by a camera 104 at time t, a $2^{nd}$ image 1304 captured by the camera 104 at time t+1, and a $3^{rd}$ image 1306 captured by the camera 104 at time t+2. By one approach, the $1^{st}$ image 1302 includes a first human 1308, a second human 1310, and a third human 1312. In some embodiments, the camera 104 captures, at time t, the $1^{st}$ image 1302 of an area at a retail store, at step 1402 and step 1502. By one approach, the control circuit 102 may receive, at step 1404 and step 1504, the $1^{st}$ image 1302. In some embodiments, the control circuit 102 may detect a plurality of key body joints for each human captured in the $1^{st}$ image 1302, at step 1406 and step 1506. For example, the control circuit 102 may detect a plurality of key body joints for the first human 1308, the second human 1310, and the third human 1312. Each of the plurality of key body joints is a point of interest along a human skeletal anatomy. In some embodiments, the detection of the plurality of key body joints may correspond to the detection of key body joints 110 in FIG. 1 as described above. In some embodiments, the key body joints detected may be the key body joints 200 shown in FIG. 2. In response to the detection of the plurality of key body joints, the control circuit 102 may determine segmentations of the plurality of key body joints to determine one or more body parts of a corresponding human, at step 1408 and step 1508. By one approach, the segmentations may correspond to the segmentation of key body joints 112 of FIG. 1. In some embodiments, the segmentations of the key body joints by the control circuit 102 may be exemplified and/or illustrated by the segmentations in FIG. 3, FIG. 4, and/or FIG. 5. In an illustrative non-limiting example, body parts of each of the first human 1308, the second human 1310, and the third human 1312 may be determined based on the detection and/or segmentations described herein. In some embodiments, steps 1406 and 1408 of the method 1400 as shown in FIG. 14 may be performed and/or executed simultaneously, in parallel, and/or substantially at the same time.

In some embodiments, the control circuit 102 may determine a color distribution map of aggregate pixels associated with each body part of each human on the $1^{st}$ image 1302, at step 1410 and step 1510. By one approach, the determination of the color distribution map may correspond to the color distribution/histogram map 116 of FIG. 1. In some embodiments, each color distribution map may be used by the control circuit 102 to differentiate between one human from another human in the $1^{st}$ image 1302 and/or the subsequent images, such as the $2^{nd}$ image 1304 and the $3^{rd}$ image 1306. For example, the control circuit 102 uses the color distribution map associated with the first human 1308 to determine whether the first human 1308 is captured in the $2^{nd}$ image 1304 and/or the $3^{rd}$ image 1306. As such, the color distribution map is used to detect and track human from one image to one or more subsequent images. In some embodiments, the database 106 may store one or more color distribution maps and/or a set of color distribution maps associated with a retail associate of a retail store. For example, each retail associate of the retail store may wear a uniform and/or a clothing to differentiate between an associate/employee and a customer of the retail store (e.g., the associate/employee may wear a blue vest). In such an example, the database 106 may store one or more color distribution maps and/or a set of color distribution maps associated with an associate wearing a uniform and/or a particular piece of clothing. The stored color distribution maps and/or the stored set of color distribution maps may be used as a reference by the control circuit 102 to compare and/or match against a color distribution map and/or a set of color distribution maps determined from a subsequent image in order to determine whether a detected human in the subsequent image is an associate or a customer. In some embodiments, the matching 120, the existing/stored/reference distribution/histogram map 118, and the matching optimization 122 of FIG. 1 and/or FIGS. 8-10 may illustrate the comparison and/or matching of a color distribution map with a stored/existing/reference color distribution map. In an illustrative non-limiting example, to identify whether the first human 1308 is a retail associate, the control circuit 102 may calculate a correlation value for each color distribution map associated with each body part of the first human 1308 with the stored color distribution maps associated with one or more body parts of a reference retail associate, at step 1512. As such, the control circuit 102 may calculate, for each human captured in an image, a correlation value for each color distribution map associated with each body part of the human with a stored color distribution map associated with each body part of a reference retail associate. In some embodiments, the stored color distribution maps associated with the one or more body parts of a reference retail associate may include one or more body parts corresponding to and/or associated with a uniform worn by a retail associate of the retail store. For example, a uniform may include a vest, a shirt, a top, and/or a pair of pants worn by each retail associate to distinguish a retail associate working at the retail store from a customer shopping at the retail store.

In some embodiments, the control circuit 102 may determine, at step 1514, that a corresponding human in an image is a retail associate of a retail store based on a determination that each calculated correlation value between a color distribution map of each body part of the corresponding human and a stored/existing/reference color distribution map of each corresponding body part of a reference retail associate is equal to and/or greater than at least a correlation threshold. For example, the control circuit 102 may determine that the first human 1308 and the second human 1310 in the $1^{st}$ image 1302 is not a retail associate based on a determination that each calculated correlation value between a color distribution map of each body part corresponding to each of the first human 1308 and the second human 1310 and the stored/existing/reference color distribution map of each corresponding body part of the reference retail associate is less than the correlation threshold. In another example, the control circuit 102 may determine that the third human 1312 in the $1^{st}$ image 1302 is a retail associate based on a determination that each calculated correlation value between a color distribution map of each body part of the third human 1312 and the stored/existing/reference color distribution map of each corresponding body part of the reference retail associate is equal to and/or greater than at least the correlation threshold.

In some embodiments, the control circuit 102 may determine that the third human 1312 in the $1^{st}$ image 1302 is a retail associate based on a determination that the third human 1312 has been captured in a plurality of subsequent images (e.g., the $1^{st}$ image 1302, the $2^{nd}$ image 1304 and/or the $3^{rd}$ image 1306) relative to the other humans (e.g., the first human 1308 and the second human 1310). In some embodiments, in response to the determination that the third human 1312 is a retail associate, the control circuit 102 may cause the database 106 and/or another database distinct from database 106 to store the color distribution map of each body part corresponding to the third human 1312. In some embodiments, color distribution maps of body parts corresponding to retail associates and/or a retail associate assigned in an exit area may be stored in another database separate from the database 106. In some embodiments, the database 106 may store color distribution maps of body parts of customers. In another embodiments, another database distinct from the database 106 may store color distribution maps of body parts corresponding to one or more retail associates that are assigned to one or more exit areas in a retail store while the color distribution maps of body parts corresponding to the rest of the retail associates in the retail store are stored in the database 106. In such an embodiment, the determination and/or identification of whether a detected human is a retail associate or not may be facilitated since the control circuit 102 may use the stored color distribution maps in the other database distinct from the database 106 as reference to determine whether a human in a subsequent image is retail associate. For example, a retail associate assigned in an exit area (e.g., an exit retail associate) may be on a break and when the same retail associate returns to the exit area, the control circuit may use the stored color distribution maps in the other database to determine whether a detected human in a subsequently captured image of the exit area is the same retail associate.

In some embodiments, the control circuit 102 may determine that the second human 1310 is near a boundary of the $2^{nd}$ image 1304 and that the second human 1310 is not detected in the $3^{rd}$ image 1306 and one or more subsequent images. In response, the control circuit 102 may stop tracking the second human 1310 in subsequent images and determine that the second human 1310 has moved out of the area. In some embodiments, the control circuit 102 may remove the stored color distribution maps of body parts corresponding to the second human 1310 from the database 106 as a result of the determination that the second human 1310 has moved out of the area. In some embodiments, the control circuit 102 may remove the stored color distribution maps of body parts corresponding to the second human 1310 from the database 106 in response to not detecting the stored color distribution maps of body parts corresponding to the second human 1310 after a period of time and/or after a number of consecutive captured images.

In some embodiments, the control circuit 102 may determine whether a human captured in one image is also captured in a subsequent image based on a determination of color distribution maps of body parts of a human in a recent image and a matching with color distribution maps of corresponding body parts of a human in a previous image. For example, the control circuit 102 may cause, at step 1412, the database 106 to store a color distribution map for each body part of the first human 1308, the second human 1310, and the third human 1312 in the $2^{nd}$ image 1304. As such, the database 106 may include a set of color distribution maps for each of the first human 1308, the second human 1310, and the third human 1312. In an illustrative non-limiting example, the control circuit 102 may receive the $3^{rd}$ image 1306. In some embodiments, the control circuit 102 may detect key body joints associated with each of the first human 1308 and the third human 1312 in the $3^{rd}$ image 1306. In some embodiments, the control circuit 102 may determine segmentations of the key body joints for every human detected in the $3^{rd}$ image 1306. In some embodiments, the control circuit 102 may determine a color distribution map of aggregate pixels for every body part of each of the first human 1308 and the third human 1312 in the $3^{rd}$ image 1306. In some embodiments, the control circuit 102 may calculate a correlation value for each color distribution map determined in the $3^{rd}$ image 1306 with each color distribution map determined and stored in the database 106 for the $2^{nd}$ image 1304. In some embodiments, the control circuit 102 may determine which of the body parts in the $3^{rd}$ image 1306 match with the body parts in the $2^{nd}$ image 1304 based on the corresponding calculated correlation value being equal to and/or greater than a correlation threshold. In some embodiments, the database 106 may store color distribution maps of body parts of one or more humans captured in a previous image.

In an illustrative non-limiting example, the control circuit 102 may determine that the first human 1308 in the $2^{nd}$ image 1304 is the human 1308 in the $3^{rd}$ image 1306 based on a determination that each calculated correlation value and/or a first predetermined number and/or percentage of calculated correlation values of the set of color distribution maps associated with the first human 1308 in the $2^{nd}$ image 1304 and the human 1308 in the $3^{rd}$ image 1306 is equal to and/or greater than a correlation threshold. In some embodiments, the control circuit 102 may determine that the second human 1310 in the $2^{nd}$ image 1304 is not the human 1308 in the $3^{rd}$ image 1306 based on a determination that each calculated correlation value and/or a second predetermined number and/or percentage of the set of color distribution maps between the second human 1310 in the $2^{nd}$ image 1304 and the human 1308 in the $3^{rd}$ image 1306 is less than and/or not equal to the correlation threshold. In such an embodiment, the control circuit 102 may determine that the second human 1310 in the $2^{nd}$ image 1304 is not the human 1312 in the $3^{rd}$ image 1306 based on a determination that each calculated correlation value and/or the second predetermined number and/or percentage of the set of color distribution maps between the second human 1310 in the $2^{nd}$ image 1304 and the human 1312 in the $3^{rd}$ image 1306 is less than and/or not equal to the correlation threshold. In response, the control circuit 102 may determine that the second human 1310 in the $2^{nd}$ image 1304 is no longer in the area as illustrated in the $3^{rd}$ image 1306 of FIG. 13.

As illustrated above, the control circuit 102 may use the color distribution map to detect and track one or more humans from one image to another and/or distinguish one human to another human in an image as being an associate/employee or a customer at a retail store. In some embodiments, the control circuit 102 may distinguish which one of the retail associates captured in an image is a retail associate assigned to an area based on a length of time a retail associate has spent at and/or proximate the area. For example, the control circuit 102 may count a number of captured images that each retail associate is detected and determine whether the count is greater than a count threshold. By one approach, the count threshold corresponds to a length of time the associate is at and/or proximate an area. As such, the control circuit 102 may distinguish a retail associate assigned to an area from another retail associate not assigned in the area based on a determination of a length of time each has spent at and/or proximate the area. In some embodiments, the control circuit 102 may distinguish one human to another human in an image as being an associate/employee or a customer at a retail store based on the color distribution map as described above and on a length of time a retail associate has spent at and/or proximate the area. In such an embodiment, using the length of time the retail associate has spent at and/or proximate the area by the control circuit 102 may provide an enhanced confidence that the identification of an associate/employee and/or a customer in a captured image is accurate within a threshold of confidence. In some embodiments, the control circuit 102 may determine that a detected human captured in an image is not a retail associate assigned to an area based on a determination that the length of time spent at and/or proximate the area by the detected human is equal to and/or less than three seconds, four seconds, five seconds, six seconds, and/or a predetermined number of seconds.

In some embodiments, the control circuit 102 may determine a count of humans that are not identified as one of retail associates of the retail store based on a determination that one or more of corresponding calculated correlation values are less than and/or not equal to at least the correlation threshold. For example, the control circuit 102 may determine that there are two customers (the first human 1308 and the second human 1310) on the $1^{st}$ image 1302. In another example, the control circuit 102 may determine that there are two customers (the first human 1308 and the second human 1310) on the $2^{nd}$ image 1304. In yet another example, the control circuit 102 may determine that there is one customer (the first human 1308) on the $3^{rd}$ image 1306. In some embodiments, in response to a count of humans in a captured image reaching a count threshold, the control circuit 102 may provide an alert message to an electronic device 124 of FIG. 1 associated with a retail store indicating that an area is currently experiencing a high volume of customer traffic and summoning an additional retail associate to the area. By one approach, the electronic device 124 may comprise a laptop, a smartphone, a smartwatch, a desktop, a computer, a monitor, and/or any electronic device capable of displaying messages to associates/employees of a retail store.

In some embodiments, the control circuit 102 may determine whether the retail associate is engaged in a particular activity based on a determination of an angle between at least two of a thigh, a leg, a hand, and a back of one or more body parts of the retail associate. For example, the control circuit 102 may estimate human poses of one or more detected humans in an image based at least in part on the detection and/or segmentation of key body joints as described herein. By one approach, the particular activity may include sitting while interacting with a customer, talking with another retail associate while there is a long customer line, checking customer's receipt prior to leaving a retail store, greeting and/or checking membership identification upon arriving at an entrance of a retail store, and/or activities that may be against a retail store's associate/employee policies, to name a few. In some embodiments, the control circuit 102 may determine an amount of time the retail associate is engaged in the particular activity over a period of time. For example, the control circuit 102 may estimate human poses for each human in a captured image based at least in part on the detection and/or segmentation of key body joints and determine a length of time each human is detected and/or tracked in subsequent images based on matching, for every detected human, color distribution maps of aggregate pixels associated with each body part of the corresponding human in a recent captured image with color distribution maps of aggregate pixels associated with each corresponding body part of humans in a previously captured image. In some embodiments, the control circuit 102 may provide an activity report including an amount of time one or more retail associates are engaged in one or more particular activities over a period of time. By one approach, the activity report may be provided to the electronic device 124. In some embodiments, in response to a determination that a first retail associate is engaged in a particular activity, the control circuit 102 may provide a message to the electronic device 124 associated with a second retail associate indicating that the first retail associate is engaged in the particular activity.

In some embodiments, the control circuit 102 may determine a count of humans that are not identified as one of retail associates/employees of a retail store over a period of time to determine on average a number of humans not identified as a retail associate/employee that linger and/or stay at a given area of the retail store (e.g., how long customers spend waiting for an associate to check receipts prior to exiting the retail store, to complete the checkout process, to address questions/issues of the customers at a customer service station, etc.). By one approach, humans that are not identified as one of the retail associates are identified by the control circuit 102 as customers. In some embodiments, to determine a count of customers, the control circuit 102 may determine whether one or more and/or each calculated correlation value and/or a third predetermined number and/or percentage of calculated correlation values of a set of color distribution maps associated with detected body parts of customers and a set of stored/reference color distribution maps associated with body parts of a reference retail associate are less than and/or not equal to at least a correlation threshold. In response to a determination that the detected human are customers, the control circuit 102 may determine an amount of time each customer spent standing proximate an area over a period of time prior to leaving a retail store to determine an average customer wait time.

In some embodiments, the control circuit 102 may initially create a body list P_list which may be used to store the people staying in a video image and/or frame before the current frame $\{P_{i1}, P_{i2} \ldots P_{in}\}$. By one approach, $i_1$, $i_2, \ldots i_n$ represent the assigned identification (ID) number of each detected human. By another approach, $P_i$ represents the color histogram map of the existing body part and the respective number of accumulated voxels Ai for each body part. In some embodiments, the control circuit 102 may, for each frame and/or image, use the bottom-up pose estimation method to estimate the key body joints (e.g., FIG. 2), key body joint connection relation (e.g., FIG. 3), and Part Affinity Field (PAF) mapping of each body (e.g., FIG. 4). In some embodiments, for each body part, based on detected key body joints, multiple regions and/or body parts may be extracted (e.g., FIG. 5). In some embodiments, for each region and/or body part, a normalized three-dimensional (3D) color histogram map may be calculated by the control circuit 102. In some embodiments, the control circuit 102 may use the 3D color histogram map to calculate the red green blue color (RGB) distribution of each body part and/or region. For example, the body part and/or region may include head, shoulder, body, left/right upper/lower arm, left/right thigh/calf region. In some embodiments, the control circuit 102 may use a rectangular box covering the key points of head (e.g., FIG. 5, a head 516) and/or body (e.g., FIG. 5, a body 518) to define the two regions. While for the other body parts and/or regions, the control circuit 102 may use the PAF map as the mask. In some embodiments, the control circuit 102 may create, for each frame and/or image being processed, a list (B) to store all the detected body parts $\{B_1, B_2 \ldots B_i\}$ in a frame. In some embodiments, $B_i$ may represent the color histogram map of each body part and the respective confidence $c_i$ and number of voxels $n_i$ for each body part to match and/or track the body part in list B with the body part in list P. In some embodiments, the histogram map of each body part may be compared part through the function. By one approach, the represents the correlation of histogram part by body part. In some embodiments, represents the confidence rate of each body part of and represents other features, such as size, intersection over union (IoU) and location of each body part. In some embodiments, for each body part $P_{i1}$ in list P, only the body with the highest $f$ value in list B may( ) be matched together by the control circuit 102 and the histogram map of each body part of $P_i$ may be updated as:

$$H_{inew}=(H_{iold}*A_{iold}+H_{bj}*n_j*c_j)/A_{inew}$$

$$A_{inew}=A_{iold}\pm n_j*c_j$$

Figure 17:
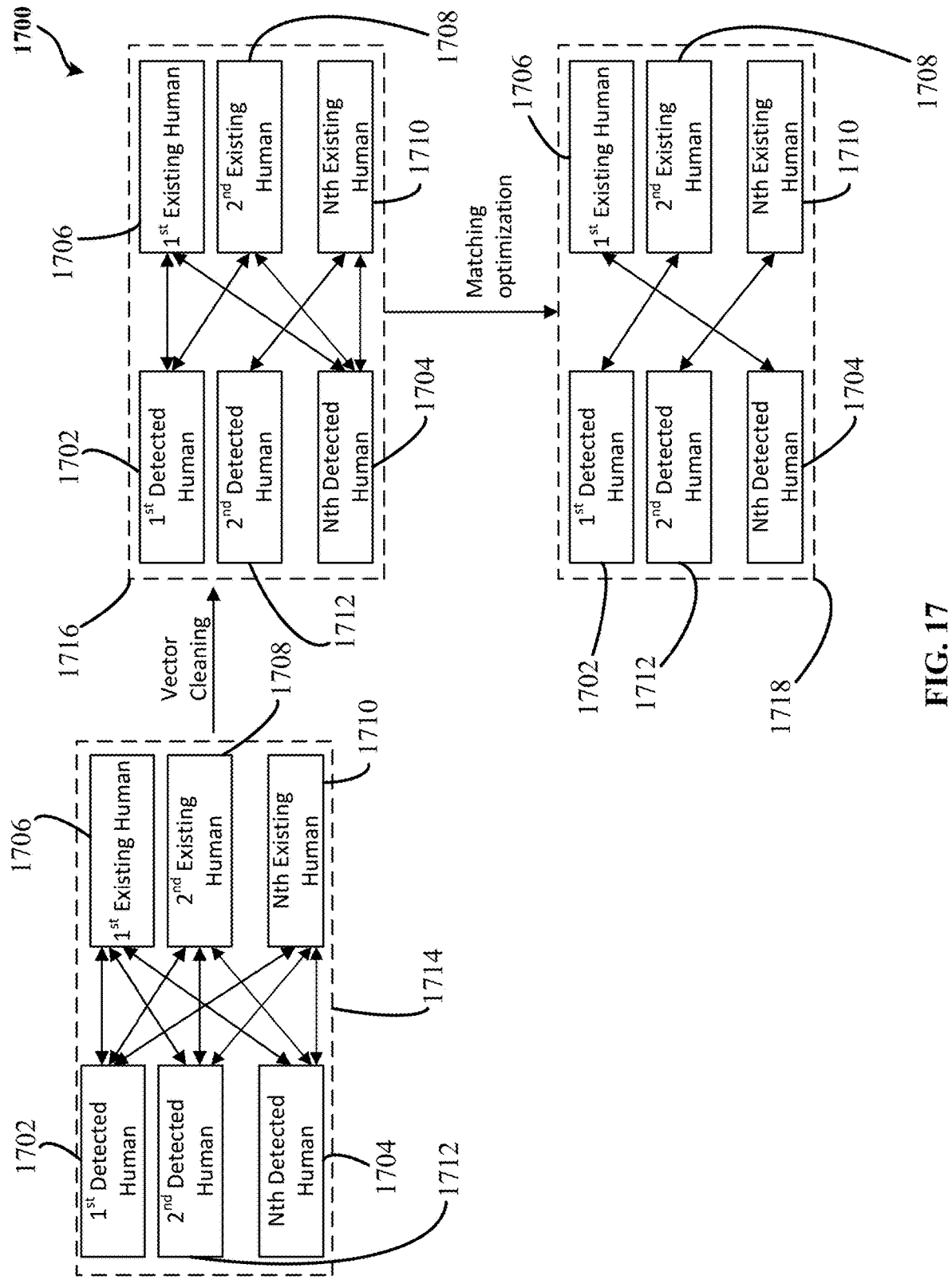
FIG. 17 is a simplified illustration of an exemplary matching optimization of color distribution maps of detected humans with color distribution maps of stored/existing/reference humans in accordance with some embodiments.

The matching method $f(*)$ may be based on Hungarian Algorithm and/or graph based methods. In some embodiments, if a body part in B may not be matched with any item in P, the control circuit 102 may create a new item with new body part ID and added to P. In some embodiment, a detected human and an existing human matching, as illustrated in FIG. 17, may be determined as illustrated below:

Possible pairs $\{P_{i,j}\}$ $P_{i,j}$ represents pairing value between ith detected body and jth existing body. The Optimization task is $\max(\Sigma W_{ij}P_{ij})$, $W_{ij}=0$ or 1

$$\sum_{j=1}^{M} W_{ij} = 1$$

for ith detected body, $$\sum_{j=1}^{M} W_{ij} = 1$$

for jth reference body $P_{ij}=g(V_{ij},IOU,f_{other})P_{ij}$ correlated with the correlation vector $V_{ij}$, IOU of two body bounding box and other possible features.

Figure 16:
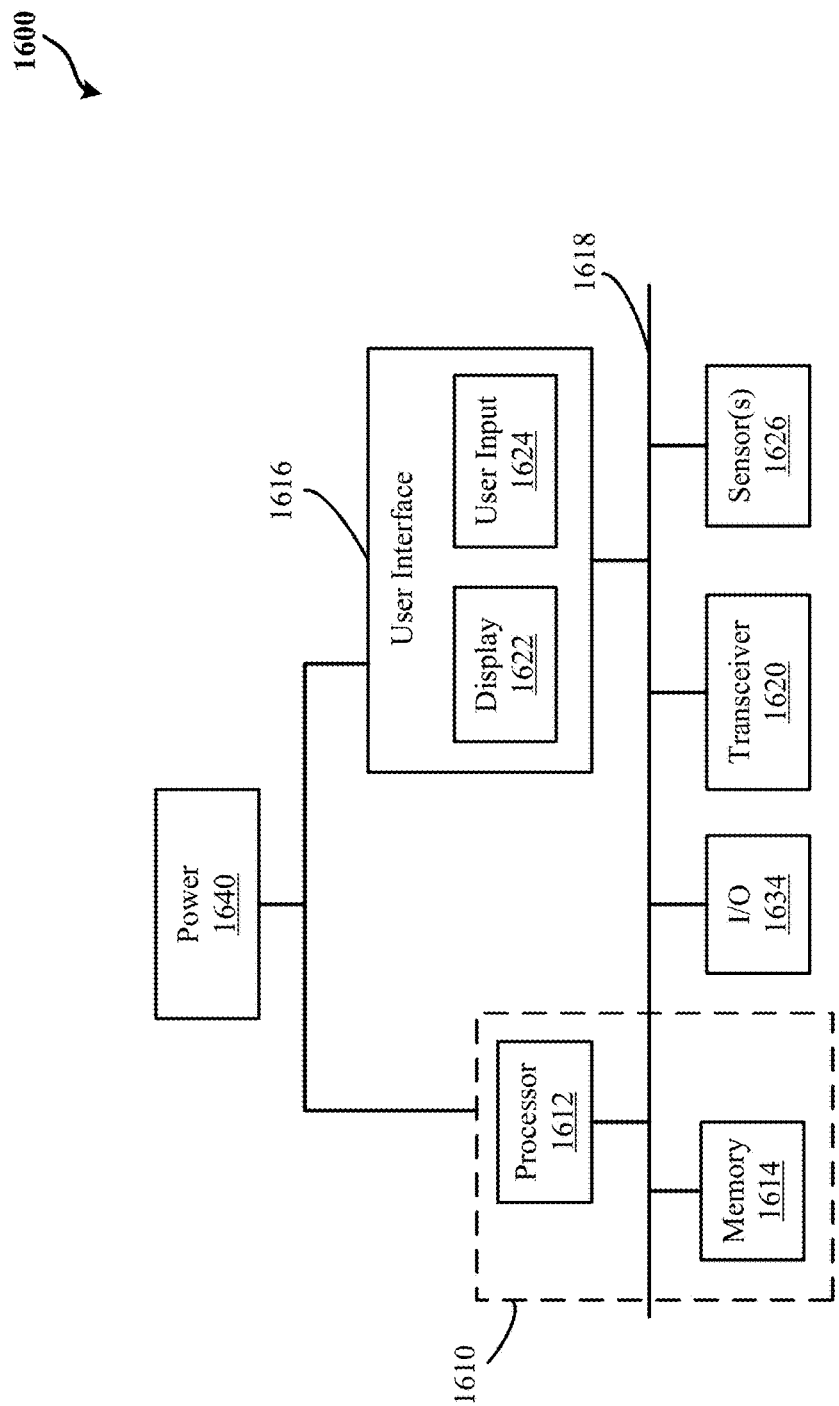
FIG. 16 illustrates an exemplary system for use in implementing methods, techniques, devices, apparatuses, systems, servers, sources for detecting and tracking humans and distinguishing a customer from an associate or employee from one image to another image, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 16 illustrates an exemplary system 1600 that may be used for implementing any of the components, circuits, circuitry, systems, functionality, apparatuses, processes, or devices of the system 100 of FIG. 1, the method 1400 of FIG. 14, the method 1500 of FIG. 15, and/or other above or below mentioned systems or devices, or parts of such circuits, circuitry, functionality, systems, apparatuses, processes, or devices. For example, the system 1600 may be used to implement some or all of the system for automatic identification of a retail associate on an image captured by a camera via analysis of color distribution maps associated with aggregate pixels of each body part of a detected human in the captured image at an area of a retail store, the system for detecting and tracking humans from one image to another image captured by a camera at a retail store, the control circuit 102, the camera(s) 104, the database 106, the electronic device 124, and/or other such components, circuitry, functionality and/or devices. However, the use of the system 1600 or any portion thereof is certainly not required.

By way of example, the system 1600 may comprise a processor module (or a control circuit) 1612, memory 1614, and one or more communication links, paths, buses or the like 1618. Some embodiments may include one or more user interfaces 1616, and/or one or more internal and/or external power sources or supplies 1640. The control circuit 1612 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 1612 can be part of control circuitry and/or a control system 1610, which may be implemented through one or more processors with access to one or more memory 1614 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 1600 may be used to implement one or more of the above or below, or parts of, components, circuits, systems, processes and the like. For example, the system 1600 may implement the system for detecting and tracking humans from one image to another image captured by a camera at a retail store and/or the system for automatic identification of a retail associate on an image captured by a camera via analysis of color distribution maps associated with aggregate pixels of each body part of a detected human in the captured image at an area of a retail store with the control circuit 102 being the control circuit 1612.

The user interface 1616 can allow a user to interact with the system 1600 and receive information through the system. In some instances, the user interface 1616 includes a display 1622 and/or one or more user inputs 1624, such as buttons, touch screen, track ball, keyboard, mouse, etc., which can be part of or wired or wirelessly coupled with the system 1600. Typically, the system 1600 further includes one or more communication interfaces, ports, transceivers 1620 and the like allowing the system 1600 to communicate over a communication bus, a distributed computer and/or communication network (e.g., a local area network (LAN), the Internet, wide area network (WAN), etc.), communication link 1618, other networks or communication channels with other devices and/or other such communications or combination of two or more of such communication methods. Further the transceiver 1620 can be configured for wired, wireless, optical, fiber optical cable, satellite, or other such communication configurations or combinations of two or more of such communications. Some embodiments include one or more input/output (I/O) interface 1634 that allow one or more devices to couple with the system 1600. The I/O interface can be substantially any relevant port or combinations of ports, such as but not limited to USB, Ethernet, or other such ports. The I/O interface 1634 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 1626 to provide information to the system and/or sensor information that is communicated to another component, such as the control circuit 102, the electronic device 124, the database 106, the camera 104, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 1600 comprises an example of a control and/or processor-based system with the control circuit 1612. Again, the control circuit 1612 can be implemented through one or more processors, controllers, central processing units, logic, software and the like. Further, in some implementations the control circuit 1612 may provide multiprocessor functionality.

The memory 1614, which can be accessed by the control circuit 1612, typically includes one or more processor readable and/or computer readable media accessed by at least the control circuit 1612, and can include volatile and/or non-volatile media, such as RAM, ROM, EEPROM, flash memory and/or other memory technology. Further, the memory 1614 is shown as internal to the control system 1610; however, the memory 1614 can be internal, external or a combination of internal and external memory. Similarly, some or all of the memory 1614 can be internal, external or a combination of internal and external memory of the control circuit 1612. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 1614 can store code, software, executables, scripts, data, content, lists, programming, programs, log or history data, user information, customer information, product information, and the like. While FIG. 16 illustrates the various components being coupled together via a bus, it is understood that the various components may actually be coupled to the control circuit and/or one or more other components directly.

In some embodiments, the control circuit 102 may determine and/or calculate a correlation vector between each color distribution map associated with each human and a color distribution map associated with each stored/existing/reference human in the database 106. To illustrate, FIG. 17 is a simplified illustration of an exemplary matching optimization 1700 of detected human with stored/existing/reference humans in accordance with some embodiments. By one approach, the matching optimization 1700 may correspond to the matching optimization 122 of FIG. 1. By another approach, each correlation vector calculated between each color distribution map associated with each human and a color distribution map associated with each stored/existing/reference human may correspond to the matching vector 912 of FIG. 9. To illustrate, a $1^{st}$ detected human 1702, a $2^{nd}$ detected human 1712, and a Nth detected human 1704 are shown in FIG. 17. In an illustrative non-limiting example, each corresponding set of body parts associated with each detected human and each stored/existing/reference human in FIG. 17 is a set of body parts that may have been determined based on the key body joints detection 110 and/or the segmentation of key body joints 112 associated with a human in an image captured by the camera 104. In some embodiments, a $1^{st}$ existing human 1706, a $2^{nd}$ existing human 1708, and a Nth existing human 1710 are stored in the database 106.

By one approach, the control circuit 102 may determine and/or calculate a first correlation vector between a color distribution map associated with the $1^{st}$ detected human 1702 and a color distribution map associated with the $1^{st}$ existing human 1706. By another approach, the control circuit 102 may determine and/or calculate a second correlation vector between the color distribution map associated with the $1^{st}$ detected human 1702 and a color distribution map associated with the $2^{nd}$ existing human 1708. By another approach, the control circuit 102 may determine and/or calculate a third correlation vector between the color distribution map associated with the $1^{st}$ detected human 1702 and a color distribution map associated with the $2^{nd}$ existing human 1708. Similarly, a corresponding correlation vector maybe determined and/or calculated for the $2^{nd}$ detected human 1712 and each of the $1^{st}$ existing human 1706, the $2^{nd}$ existing human 1708, and the Nth existing human 1710. In some embodiments, another corresponding correlation vector maybe determined and/or calculated for the Nth detected human 1704 and each of the $1^{st}$ existing human 1706, the $2^{nd}$ existing human 1708, and the Nth existing human 1710. In some embodiments, in response to determining a correlation vector, the control circuit 102 may determine whether each of the correlation values in the correlation vector is at least equal to and/or greater than a correlation threshold to determine that a detected human in a current image is the same human as the stored/existing/reference human of a previous image. For example, the correlation threshold may include a predetermined value indicating a high likelihood that the compared and/or matched body parts are the same body part belonging to a particular human. Thus, enabling the control circuit 102 to track one or more humans from one image to another image. Alternatively or in addition to, the control circuit 102 may determine whether a threshold number of the correlation values in the correlation vector is at least equal to the correlation threshold to determine that a detected human in the current image is the same human in the previous image.

For example, in response to the determination of the first correlation vector, the second correlation vector, and the third correlation vector, the control circuit 102 may determine which one of the correlation vectors has correlation values that is at least equal to and/or greater than the correlation threshold to determine whether there is a matched between the compared humans. Alternatively or in addition to, in response to the determination of the first correlation vector, the second correlation vector, and the third correlation vector, the control circuit 102 may determine which one of the correlation vectors has a threshold number of the correlation values that are at least equal to the correlation threshold to determine whether there is a matched between the compared humans.

Continuing the illustrative non-limiting example in FIG. 17, the control circuit 102 may determine that the $1^{st}$ detected human 1702 matches with the $2^{nd}$ existing human 1708 based on at least one of: the determination that each of the correlation values in the second correlation vector is at least equal to and/or greater than the correlation threshold and the determination that the second correlation vector has a threshold number of the correlation values that are at least equal to the correlation threshold. As shown in FIG. 17, the control circuit 102 may determine that the $2^{nd}$ detected human 1712 matches with the Nth existing human 1710 while the Nth detected human 1704 matches with the $1^{st}$ existing human 1706 based on a determination that each of these matches corresponds to a corresponding correlation vector having each of its correlation values being at least equal to and/or greater than a correlation threshold. Alternatively or in addition to, the control circuit 102 may determine that the $2^{nd}$ detected human 1712 matches with the Nth existing human 1710 while the Nth detected human 1704 matches with the $1^{st}$ existing human 1706 based on a determination that each of these matches corresponds to a corresponding correlation vector having a threshold number of its correlation values being at least equal to the correlation threshold.

In some embodiments, in determining whether a detected human in the current image is the same human in the previous image, the control circuit 102 may initially calculate a correlation vector between each detected human and each existing human as shown in step 1714. In some embodiments, in the step 1714, the control circuit 102 may determine which of those calculated vectors have each of their corresponding correlation values being at least equal to and/or greater than the correlation threshold. In response, the control circuit 102 may determine that a detected human may match with one or more existing humans as shown in step 1716. For example, the $1^{st}$ detected human 1702 may match with the $1^{st}$ existing human 1706 and the $2^{nd}$ existing human 1708. In some embodiments, in response to determining that a detected human matches with more than one existing human, the control circuit 102 may determine which one of the matched existing humans has a correlation vector that has the most number of correlation values relative to the other matched existing humans. In an illustrative non-limiting example, the first correlation vector between the $1^{st}$ detected human 1702 and the $1^{st}$ existing human 1706 may include four correlation values. In another illustrative non-limiting example, the second correlation vector between the $1^{st}$ detected human 1702 and the $2^{nd}$ existing human 1708 may include six correlation values. In such examples, the control circuit 102 may determine that the $1^{st}$ detected human 1702 is the same human as the $2^{nd}$ existing human 1708 as shown in step 1718.

In yet some embodiments, in response to determining that a detected human matches with more than one existing human, the control circuit 102 may determine the sum of the correlation values for each of the matched existing humans. In response, to determine which one of the matched existing humans is the same as the detected human, the control circuit 102 may determine which one of the matched existing humans has a correlation vector that has a greater sum value of correlation values relative to the other sum value of correlation values of the other matched existing humans. In an illustrative non-limiting example, the first correlation vector between the $1^{st}$ detected human 1702 and the $1^{st}$ existing human 1706 may have a sum value that is less than a sum value of the correlation values of the second correlation vector between the $1^{st}$ detected human 1702 and the $2^{nd}$ existing human 1708. In response, the control circuit 102 may determine that the $1^{st}$ detected human 1702 is the same human as the $2^{nd}$ existing human 1708 as shown in step 1718.

The systems and methods described herein can be configured to comply with privacy requirements which may vary between jurisdictions. For example, before any recording, collection, capturing or processing of user images, a "consent to capture" process may be implemented. In such a process, consent may be obtained, from the user, via a registration process for example. Part of the registration process may be to ensure compliance with the appropriate privacy laws for the location where the service would be performed. The registration process may include certain notices and disclosures made to the user prior to the user recording the user's consent. No unauthorized collection or processing of images of individuals occurs via exemplary systems and methods. The systems and methods described herein capture images of a user (e.g., a customer and/or an associate) and not biometric data associated with the user.

In some embodiments, after registration, and before collection or processing of captured images of the user occurs, a verification of the user as registered with the system and providing the required consents can occur. That is, the user's registration status as having consented to the collection of captured images can be verified prior to collecting any image data. This verification can take place, for example, by the user entering a PIN (Personal Identification Number), password, or other code into a keypad or keyboard; by the user entering into a limited geofence location while carrying a fob, mobile device (such as a smartphone), or other RF transmitter, where the device has been configured to broadcast an authorization signal.

In some embodiments, once consent is verified, captured images of the user can be captured, processed and used. In some embodiments, absent verification of consent, the camera, sensor, or other image data collection system must remain turned off In some embodiments, once consent is verified, the camera sensor or other image data collection system may be activated or turned on. In some embodiments, if any image data is inadvertently collected from the user prior to verification of consent it is immediately deleted, not having been saved to disk.

In some embodiments, any image data captured as part of the verification process is handled and stored by a single party at a single location. In some embodiments, where data must be transmitted to an offsite location for verification, certain disclosures prior to consent may be required, and the image data is encrypted. In some embodiments, the hashing of the image data received is a form of asymmetrical encryption which improves both data security and privacy, as well as reducing the amount of data which needs to be communicated.

In some embodiments, biometrica data, personal characteristics, traits, identifications, and/or the like are not determined by the control circuit 102 nor stored in the database 106. As such, any captured images described herein do not specifically identify humans in the image. Instead, the humans are generically detected in the captured images and that the control circuit 102 may also determine that the generically detected humans in the captured images are also generically detected in one or more subsequent captured images.

Several embodiments are described herein. For example, in some embodiments, a system is provided for automatic identification of a retail associate on an image captured by a camera via analysis of color distribution maps associated with aggregate pixels of each body part of a detected human in the captured image at an area of a retail store. The system comprising: a camera configured to capture, at a first time, a first image of an area at a retail store; and a control circuit coupled to the camera. The control circuit configured to receive the first image; detect a plurality of key body joints for each human captured on the first image, where each of the plurality of key body joints is a point of interest along a human skeletal anatomy; in response to the detection of the plurality of key body joints, determine segmentations of the plurality of key body joints to determine one or more body parts of a corresponding human; determine a color distribution map of aggregate pixels associated with each body part of the one or more body parts of the corresponding human on the first image, where each color distribution map is used by the control circuit to differentiate between one human from another human in the first image; calculate, for each human in the first image, a correlation value for each color distribution map associated with each body part of the corresponding human on the first image with a stored color distribution map for each body part of a reference retail associate to identify whether the corresponding human is a retail associate of the retail store; and determine that the corresponding human in the first image is the retail associate of the retail store based on at least one of: a determination that each calculated correlation value is equal to at least a correlation threshold and a determination that a threshold number of calculated correlation values is equal to at least the correlation threshold. The control circuit is further configured to determine a count of humans that are not identified as one of retail associates of the retail store based on the determination that one or more of corresponding calculated correlation values are not equal to at least the correlation threshold; and in response to the count reaching a count threshold, provide an alert message to an electronic device associated with the retail store indicating that the area is currently experiencing a high volume of customer traffic and summoning an additional retail associate to the area, where the retail associate is distinguished from the additional retail associate based on a determination of a length of time each has spent proximate the area.

In some embodiments, the area at the retail store comprises an exit and an entrance. In some embodiments, the camera comprises a closed-circuit television camera. In some embodiments, the one or more body parts comprise a pair of feet, a head, a hand, a hip, a pair of arms, a torso, a pair of thighs, a pair of entire legs, a neck, a pair of forearms, a back, and a shoulder. In some embodiments, the control circuit is further configured to represent the color distribution map as a color histogram. In some embodiments, the control circuit is further configured to determine whether the retail associate is engaged in a particular activity based on a determination of an angle between at least two of a thigh, a leg, a hand, and a back of the one or more body parts of the retail associate; and in response to the determination that the retail associate is engaged in the particular activity, provide a message to an electronic device associated with another retail associate of the retail store indicating that the retail associate is engaged in the particular activity. In some embodiments, the particular activity comprises sitting while interacting with a customer. In some embodiments, the control circuit is further configured to determine an amount of time the retail associate is engaged in the particular activity over a period of time; and provide an activity report comprising the amount of time the retail associate is engaged in the particular activity over the period of time. In some embodiments, the control circuit is further configured to determine a count of humans that are not identified as one of retail associates of the retail store based on the determination that one or more of corresponding calculated correlation values are not equal to at least the correlation threshold, where the humans that are not identified as one of the retail associates are identified as customers; and determine an amount of time each customer spent standing proximate the area prior to leaving the retail store to determine an average customer wait time. And, in some embodiments, the determination of segmentations of the plurality of key body joints of the corresponding human is based on Part Affinity Field (PAF) mapping.

In some embodiments, a method is provided for automatic identification of a retail associate on an image captured by a camera via analysis of color distribution maps associated with aggregate pixels of each body part of a detected human in the captured image at an area of a retail store. The method includes capturing, at a first time by a camera, a first image of an area at a retail store; receiving, by a control circuit coupled to the camera, the first image; detecting, by the control circuit, a plurality of key body joints for each human captured on the first image, where each of the plurality of key body joints is a point of interest along a human skeletal anatomy; in response to the detection of the plurality of key body joints, determining segmentations of the plurality of key body joints to determine one or more body parts of a corresponding human; determining, by the control circuit, a color distribution map of aggregate pixels associated with each body part of the one or more body parts of the corresponding human on the first image, wherein each color distribution map is used by the control circuit to differentiate between one human from another human in the first image; calculating, by the control circuit and for each human in the first image, a correlation value for each color distribution map associated with each body part of the corresponding human on the first image with a stored color distribution map for each body part of a reference retail associate to identify whether the corresponding human is a retail associate of the retail store; and determining, by the control circuit, that the corresponding human in the first image is the retail associate of the retail store based on at least one of: a determination that each calculated correlation value is equal to at least a correlation threshold and a determination that a threshold number of calculated correlation values is equal to at least the correlation threshold.

In some embodiments, the method further includes determining, by the control circuit, a count of humans that are not identified as one of retail associates of the retail store based on the determination that one or more of corresponding calculated correlation values are not equal to at least the correlation threshold; and in response to the count reaching a count threshold, providing, by the control circuit, an alert message to an electronic device associated with the retail store indicating that the area is currently experiencing a high volume of customer traffic and summoning an additional retail associate to the area, wherein the retail associate is distinguished from the additional retail associate based on a determination of a length of time each has spent proximate the area. In some embodiments, the area at the retail store comprises an exit and an entrance. In some embodiments, the camera comprises a closed-circuit television camera. In some embodiments, the one or more body parts comprise a pair of feet, a head, a hand, a hip, a pair of arms, a torso, a pair of thighs, a pair of entire legs, a neck, a pair of forearms, a back, and a shoulder. In some embodiments, the method further comprises representing, by the control circuit, the color distribution map as a color histogram. In some embodiments, the method further comprises determining, by the control circuit, whether the retail associate is engaged in a particular activity based on a determination of an angle between at least two of a thigh, a leg, a hand, and a back of the one or more body parts of the retail associate; and in response to the determination that the retail associate is engaged in the particular activity, providing, by the control circuit, a message to an electronic device associated with another retail associate of the retail store indicating that the retail associate is engaged in the particular activity. In some embodiments, the particular activity comprises sitting while interacting with a customer. In some embodiments, the method further comprises determining, by the control circuit, an amount of time the retail associate is engaged in the particular activity over a period of time; and providing, by the control circuit, an activity report comprising the amount of time the retail associate is engaged in the particular activity over the period of time. In some embodiments, the method further comprises determining, by the control circuit, a count of humans that are not identified as one of retail associates of the retail store based on the determination that one or more of corresponding calculated correlation values are not equal to at least the correlation threshold, wherein the humans that are not identified as one of the retail associates are identified as customers; and determining, by the control circuit, an amount of time each customer spent standing proximate the area prior to leaving the retail store to determine an average customer wait time. And in some embodiments, the determination of segmentations of the plurality of key body joints of the corresponding human is based on Part Affinity Field (PAF) mapping.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for detecting and tracking humans from one image to another image captured by a camera at a retail store, the system comprising:
    a camera configured to capture, at a first time, a first image of an area at a retail store;
    a control circuit coupled to the camera, the control circuit configured to:
    receive the first image;
    detect a plurality of key body joints of a first human captured on the first image, wherein each of the plurality of key body joints is a point of interest along a skeletal anatomy of the first human;
    in response to the detection of the plurality of key body joints, determine segmentations of the plurality of key body joints of the first human to determine one or more body parts of the first human;
    determine a color distribution map of aggregate pixels associated with each body part of the one or more body parts of the first human on the first image, wherein each color distribution map is used by the control circuit to differentiate between the first human and another human in the first image;
    cause a database to store the color distribution map for each body part of the first human in the first image; wherein the database coupled to the control circuit, the database comprising one or more color distribution map sets each associated with a detected human in a captured image of the camera;
    the camera is further configured to capture, at a second time, a second image of the area;
    the control circuit is further configured to:
    receive the second image;
    determine a color distribution map of aggregate pixels associated with each body part of one or more body parts of a second human in the second image;
    calculate a correlation value for each color distribution map associated with each body part of the first human with each color distribution map associated with each corresponding body part of the second human;
    determine that the first human in the first image is the second human in the second image based on at least one of: a determination that each calculated correlation value is equal to at least a correlation threshold and a determination that a threshold number of calculated correlation values is equal to at least the correlation threshold; and
    the control circuit is further configured to cause the database to update a previously stored color distribution map sets associated with the first human by merging the previously stored color distribution map sets with another color distribution map sets of the second human in the second image in response to the determination that the first human in the first image is the second human in the second image.

2. The system of claim 1, wherein the camera comprises a closed-circuit television camera.

3. The system of claim 1, wherein the one or more body parts comprise a pair of feet, a head, a hand, a hip, a pair of arms, a torso, a pair of thighs, a pair of entire legs, a neck, a pair of forearms, and a shoulder.

4. The system of claim 1, wherein the control circuit is further configured to represent the color distribution map as a color histogram.

5. The system of claim 1, wherein the merging of the previously stored color distribution map sets associated with a first human with another color distribution map sets of a second human in a second image updates a number of pixels associated with each color associated with a first body part in the first image with a number of pixels associated with each color associated with a second body part in the second image, the second body part in the second image being the same as the first body part in the first image.

6. The system of claim 5, wherein the control circuit is further configured to denormalize the first and second the color distribution maps prior to being merged, perform the merging and/or updating, and then normalize the updated color distribution map prior to causing a database to store the normalized updated color distribution map.

7. The system of claim 5, wherein the control circuit is further configured to:
    determine that the first human in the first image is not the second human in the second image based on a determination that one or more of each calculated correlation value is not equal to at least the correlation threshold; and
    cause the database to store the color distribution map for each body part of the second human on the second image, wherein the color distribution map associated with the second human is used to identify whether the second human is detected in a third image of the area captured by the camera.

8. The system of claim 1, wherein the control circuit is further configured to:
    calculate a correlation value for each color distribution map associated with each body part of the first human on the first image with a stored color distribution map for each body part of a reference retail associate to identify whether the first human is a retail associate of the retail store; and determine that the first human in the first image is the retail associate of the retail store based on at least one of: a determination that each calculated correlation value is equal to at least a correlation threshold and a determination that a threshold number of calculated correlation values is equal to at least the correlation threshold.

9. The system of claim 8, wherein the control circuit is further configured to:
   determine a count of humans that are not identified as one of retail associates of the retail store; and
   in response to the count reaching a count threshold, provide an alert message to an electronic device associated with the retail store, wherein the alert message summons another retail associate to the area.

10. The system of claim 1, wherein the determination of segmentations of the plurality of key body joints of the first human is based on Part Affinity Field (PAF) mapping.

11. A method for detecting and tracking humans from one image to another image captured by a camera at a retail store, the method comprising:
   capturing, at a first time by a camera, a first image of an area at a retail store;
   receiving, by a control circuit coupled to the camera, the first image;
   detecting, by the control circuit, a plurality of key body joints of a first human captured on the first image, wherein each of the plurality of key body joints is a point of interest along a skeletal anatomy of the first human;
   in response to the detection of the plurality of key body joints, determining segmentations of the plurality of key body joints of the first human to determine one or more body parts of the first human;
   determining, by the control circuit, a color distribution map of aggregate pixels associated with each body part of the one or more body parts of the first human on the first image, wherein each color distribution map is used by the control circuit to differentiate between the first human and another human in the first image;
   causing, by the control circuit, a database to store the color distribution map for each body part of the first human in the first image, wherein the database comprises one or more color distribution map sets each associated with a detected human in a captured image of the camera;
   capturing, at a second time, by the camera is further configured to capture, at a second time, a second image of the area;
   receiving, by the control circuit, the second image;
   determining, a color distribution map of aggregate pixels associated with each body part of one or more body parts of a second human on the second image;
   calculating, a correlation value for each color distribution map associated with each body part of the first human with each color distribution map associated with each corresponding body part of the second human;
   determining, that the first human in the first image is the second human in the second image based on at least one of: a determination that each calculated correlation value is equal to at least a correlation threshold and a determination that a threshold number of calculated correlation values is equal to at least the correlation threshold; and
   causing, by the control circuit, the database to update a previously stored color distribution map sets associated with the first human by merging the previously stored color distribution map sets with another color distribution map sets of the second human in the second image in response to the determination that the first human in the first image is the second human in the second image.

12. The method of claim 11, wherein the camera comprises a closed-circuit television camera.

13. The method of claim 11, wherein the one or more body parts comprise a pair of feet, a head, a hand, a hip, a pair of arms, a torso, a pair of thighs, a pair of entire legs, a neck, a pair of forearms, and a shoulder.

14. The method of claim 11, further comprising representing, by the control circuit, the color distribution map as a color histogram.

15. The method of claim 11, further comprising:
   merging, of the previously stored color distribution map sets associated with a first human with another color distribution map sets of a second human in a second image updates a number of pixels associated with each color associated with a first body part in the first image with a number of pixels associated with each color associated with a second body part in the second image, the second body part in the second image being the same as the first body part in the first image.

16. The method of claim 15, further comprising causing, by the control circuit, denormalizing the first and second color distribution maps prior to being merged, performing the merging and/or updating, and then normalizing the updated color distribution map prior to causing a database to store the normalized updated color distribution map.

17. The method of claim 15, further comprising:
   determining, by the control circuit, that the first human in the first image is not the second human in the second image based on a determination that one or more of each calculated correlation value is not equal to at least the correlation threshold; and
   causing, by the control circuit, the database to store the color distribution map for each body part of the second human on the second image, wherein the color distribution map associated with the second human is used to identify whether the second human is detected in a third image of the area captured by the camera.

18. The method of claim 11, further comprising:
   calculating, by the control circuit, a correlation value for each color distribution map associated with each body part of the first human on the first image with a stored color distribution map for each body part of a reference retail associate to identify whether the first human is a retail associate of the retail store; and
   determining, by the control circuit, that the first human in the first image is the retail associate of the retail store based on at least one of: a determination that each calculated correlation value is equal to at least a correlation threshold and a determination that a threshold number of calculated correlation values is equal to at least the correlation threshold.

19. The method of claim 18, further comprising:
   determining, by the control circuit, a count of humans that are not identified as one of retail associates of the retail store; and
   in response to the count reaching a count threshold, providing, by the control circuit, an alert message to an electronic device associated with the retail store, wherein the alert message summons another retail associate to the area.

20. The method of claim 11, wherein the determination of segmentations of the plurality of key body joints of the first human is based on Part Affinity Field (PAF) mapping.

* * * * *